(12) United States Patent
Nakashima

(10) Patent No.: US 9,906,521 B2
(45) Date of Patent: Feb. 27, 2018

(54) INFORMATION SHARING SYSTEM AND PROGRAM ENABLING COMMUNICATIONS BETWEEN A SERVER DEVICE AND PLAYER TERMINALS

(71) Applicant: ANCHOR ENTERTAINMENT INC., Shibuya-ku, Tokyo (JP)

(72) Inventor: Kotaro Nakashima, Tokyo (JP)

(73) Assignee: ANCHOR ENTERTAINMENT INC., Shibuya-Ku, Tokyo (JP)

( * ) Notice: Subject to any disclaimer, the term of this patent is extended or adjusted under 35 U.S.C. 154(b) by 99 days.

(21) Appl. No.: 15/030,158

(22) PCT Filed: Oct. 17, 2013

(86) PCT No.: PCT/JP2013/078212
§ 371 (c)(1),
(2) Date: Apr. 18, 2016

(87) PCT Pub. No.: WO2015/056331
PCT Pub. Date: Apr. 23, 2015

(65) Prior Publication Data
US 2016/0269389 A1    Sep. 15, 2016

(51) Int. Cl.
| | |
|---|---|
| *H04L 29/06* | (2006.01) |
| *G06Q 10/06* | (2012.01) |
| *A63B 71/06* | (2006.01) |
| *A63B 57/00* | (2015.01) |

(52) U.S. Cl.
CPC ............ *H04L 63/083* (2013.01); *A63B 57/00* (2013.01); *A63B 71/06* (2013.01); *A63B 71/0669* (2013.01); *G06Q 10/06* (2013.01); *G06Q 10/0639* (2013.01); *G06Q 10/06393* (2013.01)

(58) Field of Classification Search
None
See application file for complete search history.

(56) References Cited

U.S. PATENT DOCUMENTS 6,986,712 B1    1/2006  Ogawa

FOREIGN PATENT DOCUMENTS

| JP | 2000-98990 A | 4/2000 |
|---|---|---|
| JP | 2000-225226 A | 8/2000 |
| JP | 2000-350801 A | 12/2000 |
| JP | 2002-058772 A | 2/2002 |

(Continued)

*Primary Examiner* — William J. Goodchild
(74) *Attorney, Agent, or Firm* — Buchanan Ingersoll & Rooney PC

(57) ABSTRACT

An information sharing system suitable for sharing golf-related information among a plurality of golf players enables mutual communication between a server device and respective player terminals of a plurality of golf-players. When the server device receives a request to create a golf scorecard from the player terminal, the server device generates a scorecard ID and transmits the same to the player terminal; when the server device receives a request to share the golf scorecard with the other golf players, the server device generates a share password and transmits the same to the one player terminal; when the server device receives a request to authenticate the share password, the server device re-generates the scorecard ID on the basis of the share password, and transmits it to the player terminal, and, the player terminal re-creates a golf scorecard that can be shared.

5 Claims, 34 Drawing Sheets

(56) References Cited

FOREIGN PATENT DOCUMENTS

| | | | |
|---|---|---|---|
| JP | 2002-369904 A | 12/2002 | |
| JP | 2006-81696 A | 3/2006 | |
| JP | 2010-35796 A | 2/2010 | |
| JP | 2012-170662 A | 9/2012 | |
| WO | WO 9722388 A1 * | 6/1997 | ......... A63B 71/0669 |
| WO | WO 2005063345 A1 * | 7/2005 | ......... A63B 71/0605 |
| WO | WO 2010/016616 A1 | 2/2010 | |

* cited by examiner (Slave ID)

Score creator  A

Score participator B

235−20120504−01− A
235−20120504−01− B (Parent ID)

Golf play facilities + Creation date + Creation sequence number

| Golf play facilities list | | | | |
|---|---|---|---|---|
| When the golf play facilities name is too long to be fitted, display it...on or scroll by focusing | | | | |
| 18H | Appli data | 18 / 18 | Shared data | 0 / 18 |
| As the golf play facilities names and so on are too long to be fitted,... | | | | |
| 36H | Appli data | 27 / 36 | Shared data | 1 / 36 |
| Golf play facilities name and so on | | | | |
| 18H | Appli data | 18 / 18 | Shared data | 6 / 18 |
| Golf play facilities name and so on | | | | |
| 18H | Appli data | 15 / 18 | Shared data | 18 / 18 |
| Golf play facilities name and so on | | | | |
| 27H | Appli data | 18 / 27 | Shared data | 10 / 27 |
| Golf play facilities name and so on | | | | |
| 18H | Appli data | 18 / 18 | Shared data | 18 / 18 |
| Golf play facilities name and so on | | | | |
| 18H | Appli data | 18 / 18 | Shared data | 0 / 18 |
| Golf play facilities name and so on | | | | |
| 18H | Appli data | 17 / 18 | Shared data | 12 / 18 |

1005a

S1        ULTRACADDY        S8

| Golf play facilities list |
|---|

| When the golf play facilities name is too long to be fitted, display it...on or scroll by focusing | | | | | 1005a |
|---|---|---|---|---|---|
| 18H | Appli data | 18/18 | Shared data | 0/18 | |

| As the golf play facilities names and so on are too long to be fitted,... | | | | |
|---|---|---|---|---|
| 36H | Appli data | 27/36 | Shared data | 1/36 |

| Golf play facilities name and so on | | | | |
|---|---|---|---|---|
| 18H | Appli data | 18/18 | Shared data | 6/18 |

| Golf play facilities name and so on | | | | |
|---|---|---|---|---|
| 18H | Appli data | 15/18 | Shared data | 18/18 |

| Golf play facilities name and so on | | | | |
|---|---|---|---|---|
| 27H | Appli data | 18/27 | Shared data | 10/27 |

| Golf play facilities name and so on | | | | |
|---|---|---|---|---|
| 18H | Appli data | 18/18 | Shared data | 18/18 |

| Golf play facilities name and so on | | | | |
|---|---|---|---|---|
| 18H | Appli data | 18/18 | Shared data | 0/18 |

| Golf play facilities name and so on | | | | |
|---|---|---|---|---|
| 18H | Appli data | 17/18 | Shared data | 12/18 |

S1    ULTRACADDY    S8

Golf play facilities name

| | | Course name | | | |
|---|---|---|---|---|---|
| 2H | Appli data | O | Shared data | O | |
| | Estimate | -3 -2 -1 ☆ 0 +1 +2 +3 | | | |
| 3H | Appli data | O | Shared data | O | |
| | Estimate | -3 -2 -1 0 +1★ +2★ +3★ | | | |
| 4H | Appli data | O | Shared data | O | |
| | Estimate | -3 -2 -1 0 +1 +2 +3 | | | |
| 9H | Appli data | O | Shared data | O | |
| | Estimate | -3 ☆-2 ☆-1 ☆ 0 +1 +2 +3 | | | |

| | | IN | | | |
|---|---|---|---|---|---|
| 10H | Appli data | O | Shared data | O | |
| | Estimate | -3 -2 -1 0 ★+1 ★+2 ★+3 | | | |
| 13H | Appli data | O | Shared data | O | |
| | Estimate | -3 -2 -1 0 +1 +2 +3 | | | |
| 18H | Appli data | O | Shared data | O | |
| | Estimate | -3 ☆-2 ☆-1 ☆ 0 +1 +2 +3 | | | |

1006a → (pointing to 2H row)

S1    ULTRACADDY    S8

FIG. 13B

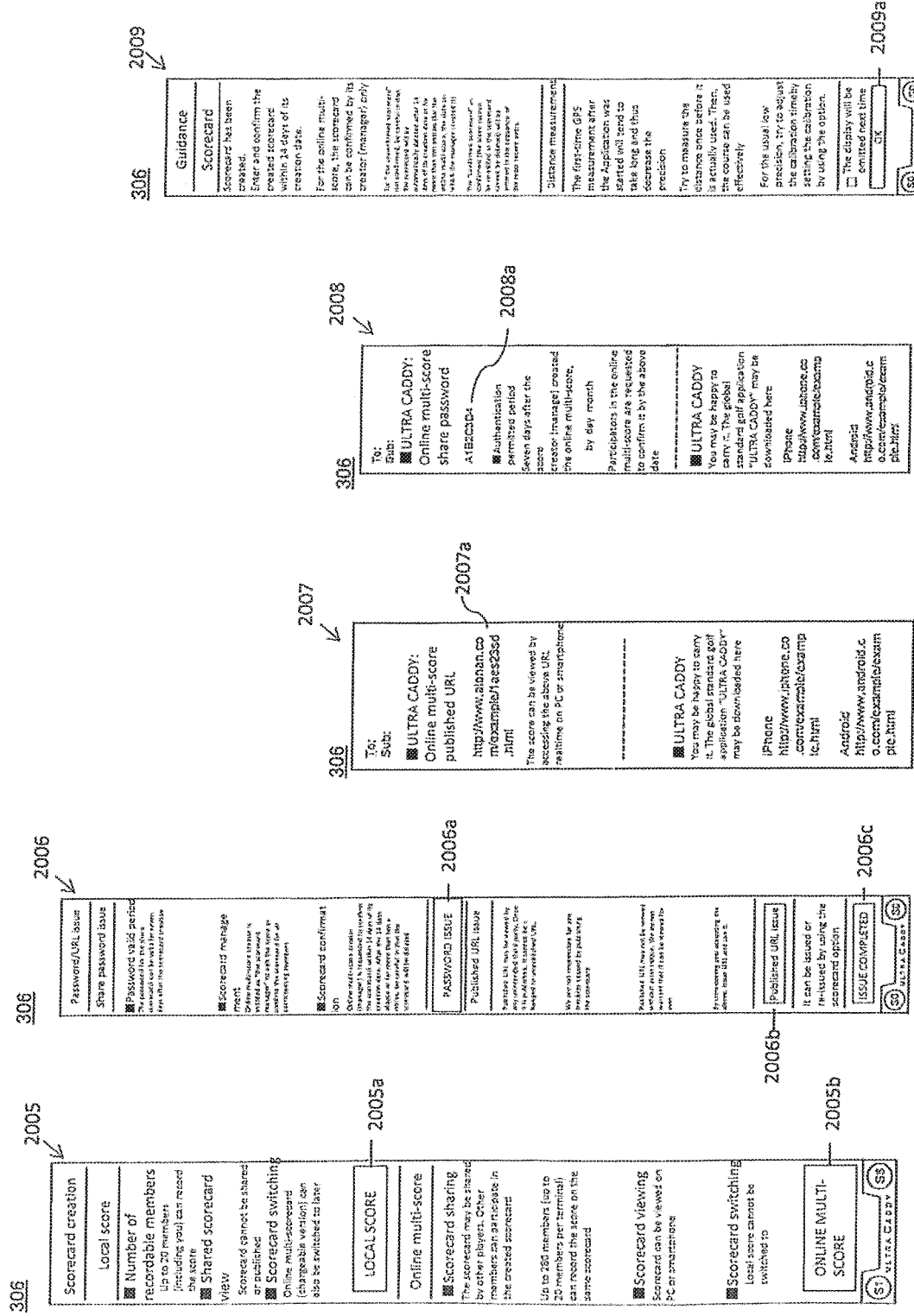

306

Scorecard list — 2010

| Round | Golf play facilities | Condition | Period/Confirmed |
|---|---|---|---|
| 2013/04/20 | If the golf play facilities name is too long to be fitted, cut... | | 2013/05/04 |
| 2013/04/17 | As the golf play facilities name is too long to be fitted here | | 2013/05/01 |
| 2013/04/16 | Anchor golf play facilities | | 2013/04/30 |
| 2013/04/28 | Anchor golf course Ibaraki | | 2013/04/30 |
| 2013/04/10 | Golf club anchor entertainment | | 2013/04/12 |
| 2013/03/26 | Pacific Golf Club resort anchor entertainment | | 2013/03/31 |
| 2013/03/25 | Anchor club | | 2013/04/01 |
| 2013/02/10 | Country club anchor | | 2013/02/20 |
| 2013/02/09 | Anchor entertainment golf play facilities | | 2013/02/23 |

| ROUND DAY : 2013/05/05 | S9 | 1 | 2 | 3 | 4 | 5 | 6 | 7 | 8 | 9 | OUT | TOTAL | HCP INDEX | | HCP | NET |
|---|---|---|---|---|---|---|---|---|---|---|---|---|---|---|---|---|
| Player Register/Edit | | | | | | Kabushiki Kaisha Anchor Entertainment Country Club | | | | | | | S-RATE | | | |
| 1 | Y-nakashima | 4 | 4 | 3 | 5 | 3 | 5 | 3 | 5 | 4 | 36 | 36 | | | | |
| | | 3 | 6 | 4 | 4 | 6 | 5 | 3 | 5 | 4 | 23 | 23 | | | | |
| | | 2 | 3 | 2 | 2 | 3 | 3 | 2 | 3 | 4 | 12 | 12 | | | | |

| | | 1 | 2 | 3 | 4 | 5 | 6 | 7 | 8 | 9 | OUT | TOTAL | HCP INDEX | | HCP | NET |
|---|---|---|---|---|---|---|---|---|---|---|---|---|---|---|---|---|
| | | | | | | | | | | | | | S-RATE | | | |

Scorecard — Kabushiki Kaisha Anchor Entertainment Country Club

ROUND DAY : 2013 / 05 / 05    S9

| # | Name | | 1 | 2 | 3 | 4 | 5 | 6 | 7 | 8 | 9 | OUT | TOTAL | HCP | NET |
|---|---|---|---|---|---|---|---|---|---|---|---|---|---|---|---|---|
| 1 | Y-nakashima | ※ | 4 | 4 | 3 | 4 | 5 | 5 | 3 | 5 | 4 | 35 | 36 | 10 | 33 |
| 2 | Ngata-hiroyuki | ※ | 3 | 10 | 4 | 5 | 7 | 4 | 3 | 4 | 4 | 43 | 43 | 3 | 34 |
| 3 | K-nakashima | ※ | 2 | 3 | 2 | 2 | 3 | 2 | 1 | 2 | 2 | 19 | 19 | | |
| 4 | Nao-K | ※ | 5 | 4 | 3 | 7 | 3 | 5 | 3 | 4 | 3 | 37 | 37 | 7 | |
| 5 | Anchor-X | ※ | 5 | 5 | 5 | 6 | 4 | 4 | 4 | 5 | 4 | 43 | 43 | 2 | 37 |
| 6 | B-DAN | ※ | 3 | 4 | 3 | 3 | 3 | 1 | 2 | 1 | 2 | 16 | 16 | 15 | 37 |
| 7 | Sato-J | ※ | 3 | 4 | 5 | 6 | 5 | 5 | 3 | 4 | 3 | 35 | 35 | 11 | 15 |
| | | | 4 | 5 | 5 | 6 | 5 | 7 | 4 | 6 | 7 | 53 | 53 | | |
| | | | 2 | 2 | 2 | 3 | 1 | 1 | 6 | 1 | 3 | 6 | 6 | 2 | 22 |
| | | | 4 | 6 | 4 | 3 | 4 | 5 | 2 | 4 | 2 | 29 | 29 | | |
| | | | 5 | 3 | 4 | 5 | 3 | 2 | 1 | 3 | 2 | 24 | 24 | | |
| | | | 3 | 3 | 2 | 3 | 3 | 3 | 1 | 2 | 1 | 18 | 18 | | |

SCORE ID :235-20120504-01-A   OUT : East out   SYSTEM : Peoria-II (Notice) HCP range; Man (∞)~(99) Woman +10~(∞)

★ You may be happy to carry this scorecard

INFORMATION SHARING SYSTEM AND PROGRAM ENABLING COMMUNICATIONS BETWEEN A SERVER DEVICE AND PLAYER TERMINALS

BACKGROUND

Technical Field

The present invention relates to information sharing system and program that are suitable for sharing golf-related information among a plurality of golf players. In the specification, the word "the golf play facilities" should be understood to mean that the golf play facilities are the facilities that provide a number of golf courses. It should be understood, therefore, that in its strict sense of the word, the word "the golf play facilities" is used differently from the word "the golf courses". It should be understood that the word "the carry distance" means the distance traveled by a struck golf ball and that the "the remaining distance" means the distance that remains for the golf ball to travel up to the green.

Description of the Prior Art

As it is known to the prior art, there have been various proposals that are made to utilize the information communications technology to offer the golf-related information such as the golf play facilities, the golf courses provided by the golf play facilities, the carry distance (which may be referred to hereinafter as the distance traveled by a struck golf ball), the remaining distance (which may be referred to as hereinafter as the distance that remains for the golf ball to travel up to the green) and the like.

Patent Document 1 proposes the invention in which by utilizing the golf player's current position information, it provides the detailed map information within the golf play facilities or golf courses, the map describing, in detail, the information such as the tee grounds, fairways, bunkers, ponds, roughs, OB, greens, pins, trees, houses and the like as well as the locations, shapes, ups and downs and the like thereof), the climate information within the golf play facilities (such as the temperature, relative humidity, wind direction, wind velocity, thunders and the like which are expected to occur), the information related to each of the specific golf courses (such as the information that describes whether the gold course is simply the golf ball driving (practicing) course or not, the target point aimed at by the player when the ball is driven), the grass grains on the green, the slants and the like), the best choice of the appropriate golf club that strikes the golf ball up to the nearest point of the pin or hole, all of such information specifically listed above being offered to the golf players on their respective mobile phones.

Some of such information include the map information within the gold play facilities or golf courses, the information related to the expected climate or weather within the golf play facilities and the information related to each of the specific golf courses, all of which will be entered or updated by the server device located on the side of the system administrator. Others include the information related to the best choice of the appropriate golf club that strikes the golf ball up to the nearest point of the pin or hole which may be computed by the server device on the side of the system administrator on the basis of the golf player's current position information and pin or hole position information.

PRIOR TECHNICAL DOCUMENTS

Patent Documents

Patent Document 1: Patent application No. 2000-225226 opened to the public examination.

It should be noted, however, that some golf players may play the golf by relying on the information specifically listed above and provided by the server device on the system administrator side, and may also want to estimate such information and share the estimated information with the other golf players. It may be preferable to those golf players that they can share the golf scores of other players, thereby finding the pleasure in playing the golf.

Based on the problems associated with the prior art, the principal object of the present invention is to provide the information sharing system and program that are suitable for sharing the golf-related information among a plurality of golf players.

SUMMARY OF THE INVENTION

In order to eliminate the above described problems, the invention is provided as described below.

The invention according to claim 1 provides an information sharing system that enables mutual communications to occur between a server device and each of the player terminals for a plurality of golf players over a communications network, wherein it comprises:

said server device that includes a scorecard ID creating means for receiving a request to create a golf scorecard from each of the plurality of player terminals, generating a scorecard ID consisting of a master ID for causing each of the player terminals to create said golf scorecard and a slave ID for identifying each of the player terminals, and transmitting said generated scorecard ID to each of the player terminals and said plurality of player terminals each of which includes a scorecard creating means for acquiring said scorecard ID and creating a golf scorecard in response to the receipt of said acquired scorecard ID and the information related to a golf course previously stored therein and wherein said server device further includes a share password generating means for receiving, from one particular player terminal of the other golf player terminals, a request to cause said created golf scorecard to be shared by each of the other golf player terminals, generating a share password with which said master ID is associated and which causes said golf scorecard to be shared by each of the other player terminals and transmitting said share password to each of the other player terminals and a share password authenticating means for authenticating a request to authenticate said share password from each of the other player terminals which have acquired said share password from said one particular player terminal and matching a master ID which is the same as said master ID associated with said share password against the master ID's associated with the plurality of scorecard ID's previously stored in the storing means on said server device, said scorecard ID generating means being operated for re-generating a scorecard ID consisting of said matched master ID and the slave ID for identifying said one particular player terminal and each of the other player terminals and transmitting said re-generated scorecard ID to said one particular player terminal and said each of the other player terminals, and said scorecard creating means being operated for creating a golf scorecard to be shared by a plurality of golf players in response to the receipt of said re-generated scorecard ID and the information related to said golf course.

The invention according to Claim 2 provides an information sharing system as defined in Claim 1, wherein said server device further includes a scorecard published player terminal information generating means for receiving, from said one particular player terminal, a request to publish said scorecard for said one particular golf player so that one or more viewers who desire to view said scorecard can be allowed to view said scorecard, generating said golf scorecard published terminal information that can be viewed by said one or more viewers on their respective viewer terminals and over said communications network, and transmitting said scorecard to said one particular player terminal, said one particular player terminal that has acquired said golf scorecard published terminal information including a transmitting means for transmitting said golf scorecard published terminal information to the respective viewer terminals for said one or more viewers who have acquired said scorecard.

The invention according to Claim 3 provides an information sharing system as defined in Claim 1 or 2, wherein said player terminal is capable of exchanging communications with the GPS satellite over the satellite communication circuit, and further includes a current position information acquiring means for acquiring the current position information for each of the player terminals by way of the satellite communications with said GPS satellite and wherein said server device further includes a golf ball carry distance computing means for acquiring the information related to at least two current positions as acquired by said player terminal and computing a golf ball distance traveled by said golf player as the distance for a stroked golf ball to travel in response to the receipt of the information related to said at least two current positions, a remaining distance computing means for computing the distance that remains from the golf ball's current position for each of said other golf players up to the green as the distance from the golf ball's current position for said each of the other player terminals up to the target coordinates up to the green in response to the receipt of the position information for said one particular player terminal that corresponds to the target coordinates up to the green as transmitted by said one particular player terminal and the position information for each of said other player terminals as transmitted by each of said other player terminals and an estimated information gathering means for acquiring estimated information as estimated by said other golf players in respect of the target coordinates up to the green, wherein said estimated information as gathered is transmitted to each of said other player terminals.

The invention according to claim 4 provides an information sharing system as defined in claim 3, wherein said player terminal further includes:

a tilt detector means for detecting any tilt of said player terminal along the X axis, Y axis and Z axis and a function display switching means for detecting any tilt of said player terminal as indicated by said tilt detector means and switching between one function indicated as the vertical tilt and one function indicated as the horizontal tilt or between the other function indicated as the horizontal tilt and the other function indicated as the vertical tilt, all of said indications being provided by an information display means included in said player terminal.

The invention according to claim 5 provides a program that implements each of the functional means included in the information sharing system as defined in any one of claims 1 through 4.

Advantages of the Invention

As one of its advantages, the present invention provides an information sharing system and program that are suitable for sharing golf-related information among a plurality of golf players.

BRIEF DESCRIPTION OF DRAWINGS

FIG. 2A represents the arrangement of the player terminal and FIG. 2B represents one example of the scorecard ID;

FIG. 7A and FIG. 7B illustrate the sequence of the steps which are followed in selecting the appropriate golf play facilities as shown in FIG. 6 in which FIG. 7A shows one example of the golf play facilities list and FIG. 7B shows one example of the listing of the golf course names that are available in the appropriate one of the golf play facilities selected on the menu screen;

FIG. 10A and FIG. 10B illustrate the display unit on any one of the other player terminals on which FIG. 10A one example of the golf play facilities list is presented and FIG. 10B one example of the round condition selecting screen is presented;

FIG. 13A, FIG. 13B and FIG. 13C illustrate one example of the screen on any one of the other player terminals on which the position information of the one particular terminal in the selected target coordinates is estimated, in which FIG. 13A illustrates one example of the golf play facilities list FIG. 13B illustrates one example of the screen on which the golf course in the golf play facilities where the estimation will be preformed is selected and FIG. 13C illustrates one example of the screen on which the estimation is performed;

FIG. 15B illustrates one example of the round condition selecting screen;

FIG. 17A-FIG. 17E represent one example of the sequence of the steps that are followed in creating a golf scorecard beginning with the state in FIG. 16A and FIG. 16B, in which FIG. 17A illustrates one example of the scorecard selecting screen, FIG. 17B illustrates one example of the screen on which the share password and the gathered score published URL are issued, FIG. 17C illustrates one example of the screen on the viewer terminal 9 on which the scorecard published URL has been noticed, FIG. 17D illustrates one example of the screen on each of the other player terminals on which the share password has been noticed and FIG. 17E illustrates one example of the screen on which the scorecard ID has been acquired and the scorecard creation has been completed;

FIG. 18A illustrate one example of the scorecard listing screen, FIG. 18B illustrates one example of the scorecard presented by one particular golf player and FIG. 18C illustrates one example of the golf scorecard that is shared by several ones of the other golf players;

FIG. 19A illustrate one example of the golf scorecard in which the golf scorecard presented from each of several golf players has not yet been entered and FIG. 19B illustrates one example of the screen on which the golf scorecard can be entered.

BEST MODE OF EMBODYING THE INVENTION

Figure 1:
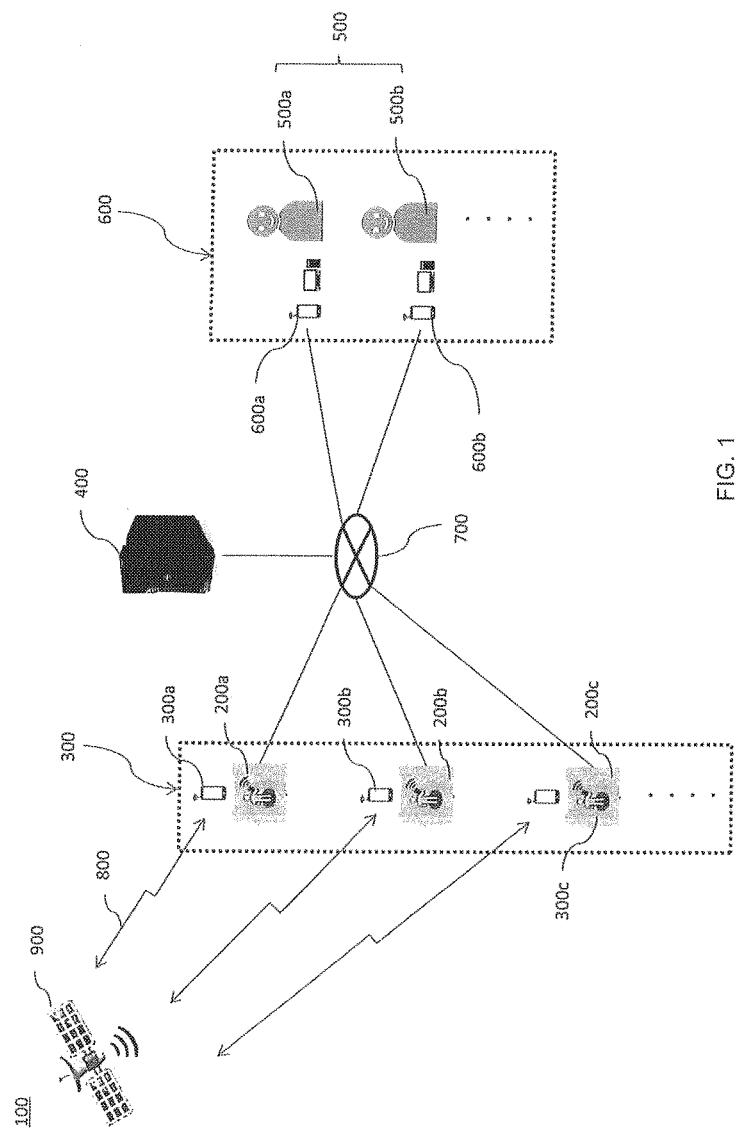
FIG. 1 illustrates the concept of one example of the configuration of the information sharing system in accordance with one embodiment of the present invention.

The following describes several embodiments of the present invention by referring to the accompanying drawings. FIG. 1 illustrates the concept of one example of the configuration of the information sharing system in accordance with one embodiment of the present invention.

The information sharing system in accordance with one embodiment of the present invention includes a plurality of player terminals 300a, 300b, 300c and so on (which may be referred to collectively as the player terminal 300) which are respectively owned by a plurality of golf players 200a, 200b, 200c and so on (which may be referred to collectively as the golf player 200), a server device 400, and a plurality of viewer terminals 600a, 600b and so on (which may be referred to collectively as the viewer terminal 600) on which the golf scores of the golf player 200 may be viewed by a plurality of viewers 500a, 500b and so on (which may be referred to collectively as the viewer 500.

The player terminal 300, the server device 400 and the viewer terminal 600 are connected to each other so that they can exchange communications with each other over the communications network 700 such as the internet communication network and the like.

In addition, the player terminal 300 is arranged such that it is capable of exchanging communications with the GPS satellite 900 over the satellite communications circuit 800 and that it can acquire its current position information from the GPS satellite 900.

Figure 2A:
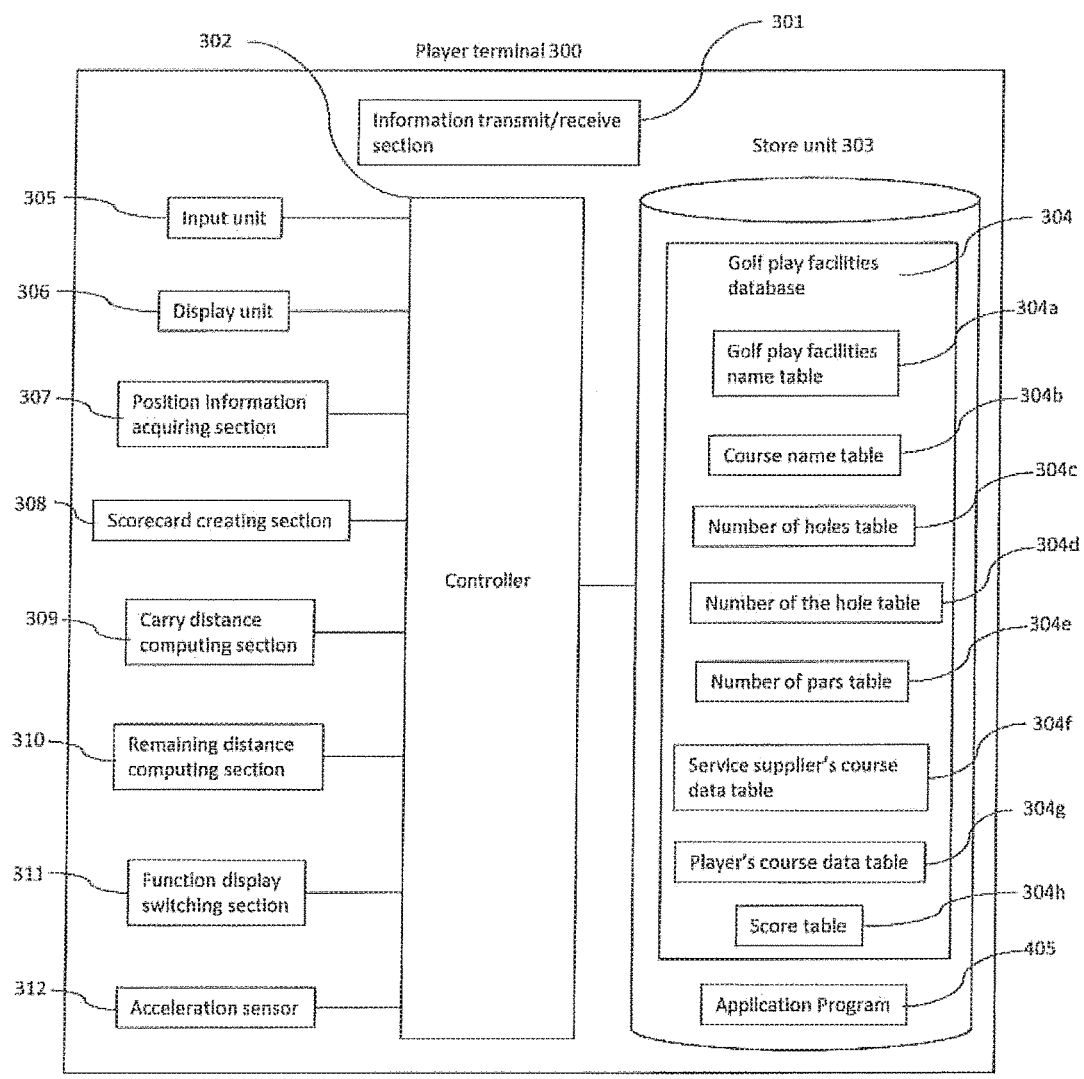

FIG. 2 (a) illustrates one example of the arrangement of the player terminal 300 and FIG. 2 (b) illustrates one example of the scorecard which may be provided from the server device 400 in response to the receipt of the request submitted from the player terminal 300.

The player terminal 300 is a portable information communication apparatus such as a mobile phone, a smartphone, a tablet terminal and the like, and includes an information transmit/receive function 301 that can be enabled to exchange the information communications with the server device 400, the viewer terminal 600 and the GPS satellite 900.

The player terminal 300 further includes a store unit 303 such as an internal storage on which the information or data can be stored, an input unit 305 such as a keyboard, a touch panel and the like on which the information or data can be entered, and a display unit 306 such as an LC panel and the like on which the information or data can be displayed.

The store unit 303 may store an application program 405 that runs on the information sharing system 100 of the present invention and will be transmitted by the server device 400 in response to the receipt of the request submitted from the player terminal 300.

When the application program 405 is running on the information sharing system 100, a golf play facilities database that contains the information related to the golf play facilities will be transmitted by the server device 400 and stored in the store unit 303 in response to the receipt of the request submitted from the player terminal 300.

Specifically, the golf play facilities database 304 may contain a golf play facilities name table 304a having therein for the entries for the golf play facilities names, a golf course name table 304b having therein the entries for the specific golf course names which are available within the golf play facilities, a holes table 304c having therein the entries for the number of holes on a given golf course, a hole number table 304d having therein the entries for the hole number, and a pars table 304e having therein the entries for the number of pars on a given hole.

The golf play facilities database 304 may further contain a golf course data table having therein the entries for the target coordinates up to the green which may be required for computing the distance that remains for a golf ball to travel from its current position up to the green and will be transmitted by the server device 400 in response to the receipt of the request submitted from the player terminal 300. It is noted that there are two types of golf course data tables, one type being the service supplier's course data table 304*f* having therein the entries that are provided by the service supplier using the system of the present invention and the other type being the player's course data table 304*g* having therein the entries that are provided by the golf player 200. The target coordinates up to the green contained in those course data tables may be associated with the entry for the hole number contained in the hole number table 404*d* provided by the server device 400, which will be described later.

In addition, the golf play facilities database 304 may contain a score table 304*h* having therein the entries for the golf scores that will be gathered by the golf player 200 and may be transmitted by the server device 400 in response to the receipt of the request submitted from the player terminal 300.

The player terminal 300 further includes a position information acquiring function 307 usually in the form of the GPS receiver that receives the player terminal's position information acquired from the GPS satellite 900.

The player terminal 300 further includes a scorecard creating function 308 that creates a golf scorecard having the specific format by using the scorecard ID transmitted from the server device 400 in response to the receipt of the request submitted from the player terminal 300 and the various types of data acquired from each respective one of the tables contained in the golf play facilities database 304.

One example of the scorecard ID is presented in FIG. 2 (*b*). The scorecard ID consists of the combination of master ID and slave ID. The master ID may consist of any combination of the golf play facilities ID, the date and time on which the server device 400 is requested to create the golf scorecard and the number that identifies the sequence in which the server device 400 is requested to create the golf scorecard. The slave ID is the code that may be attached to the master ID to identify the one particular player terminal that has requested the server device 400 to create the golf scorecard or any one of the other player terminals that wants to share the created golf scorecard with the one particular player terminal.

The player terminal 300 further includes a carry distance computing function 309 that may be enabled to computes the carry distance or the distance traveled by a stroked golf ball from the current position information of the player terminal 300. The distance traveled by a stroked golf ball may be computed by utilizing the two-point position coordinates for the player terminal 300 that correspond to the golf ball's current position.

The player terminal 300 further includes a remaining distance computing function 310 that may be enabled to compute the distance that remains for the golf ball to travel from its current position up to the green by using the position information of the player terminal 300 and the target coordinates up to the green that will be transmitted from the server device 400 in response to the receipt of the request submitted from the player terminal 300. The distance that remains for the golf ball to travel up to the green may be computed by using the position coordinates of the player terminal 300 that corresponds to the golf ball's current position and the above-described target coordinates for the golf ball to travel up to the green.

In computing the distance that remains for the golf ball to travel up to the green, it should be noted that the target coordinates for the golf ball to travel up to the green that are contained in the service supplier's course data table 304*f* or in the player's course data table 304*g* may be utilized.

The player terminal 300 further includes a function display switching function 311 that may be enabled to switch between one function display screen indicating that the terminal is tilted vertically and one function display screen indicating that the terminal is tilted horizontally or between the other function display screen indicating that the terminal is tilted horizontally and the other function display screen indicating that the terminal is tilted vertically.

More specifically, the function display switching function 311 provides the switching capability and may be enabled to respond to any tilt of the player terminal 300 as detected by the acceleration sensor 312 included in the player terminal 300 and switch between the menu screen indicating that the terminal is tilted vertically and the scorecard list screen indicating that the terminal is tilted horizontally or between the scorecard screen indicating that the terminal is tilted horizontally and the screen for measuring the distance traveled by a stroked golf ball and the distance that remains for the golf ball to travel up to the green indicating that the terminal is tilted vertically.

The units and functions that have been described so far are placed under the control of the controller 302, which may include CPU and main memory.

Figure 3A:
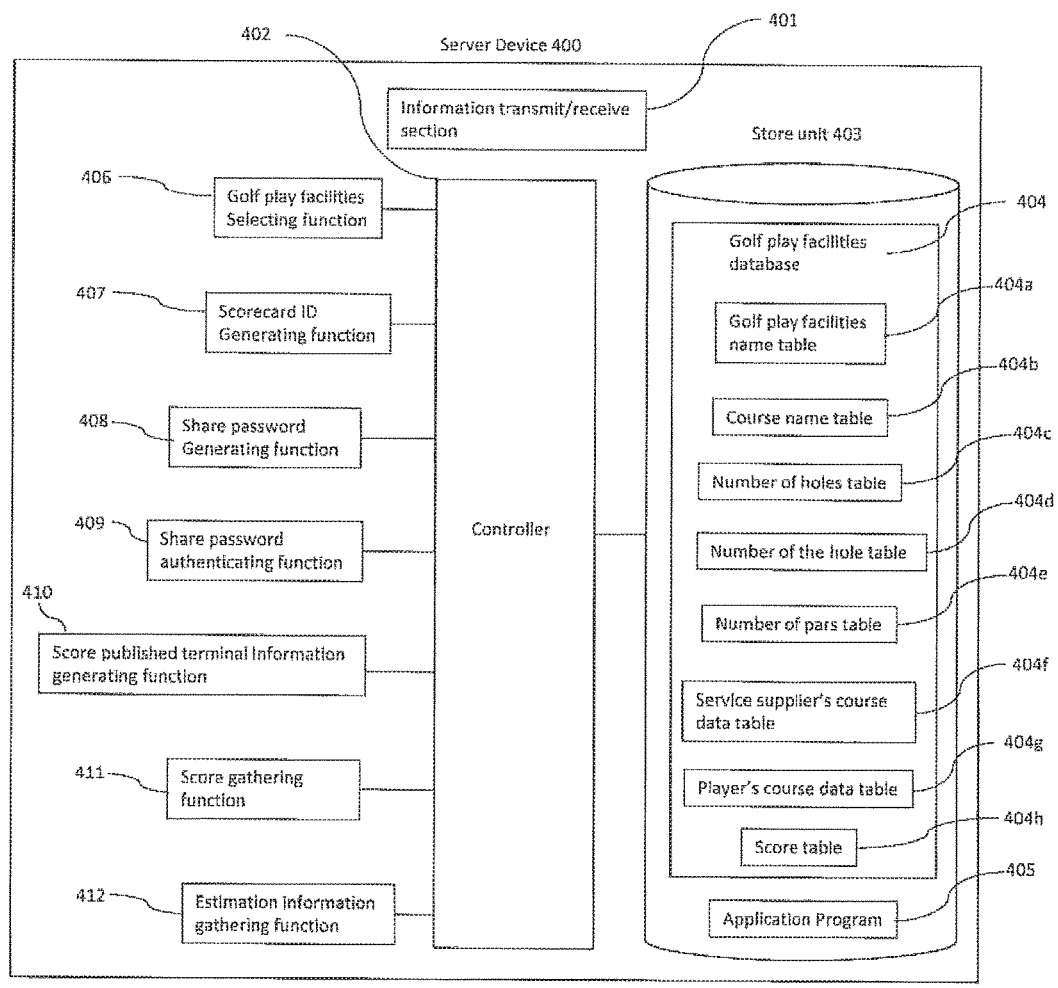
FIG. 3A represents the arrangement of the server device and FIG. 3B represent the arrangement of the viewer terminal.
Figure 3B:
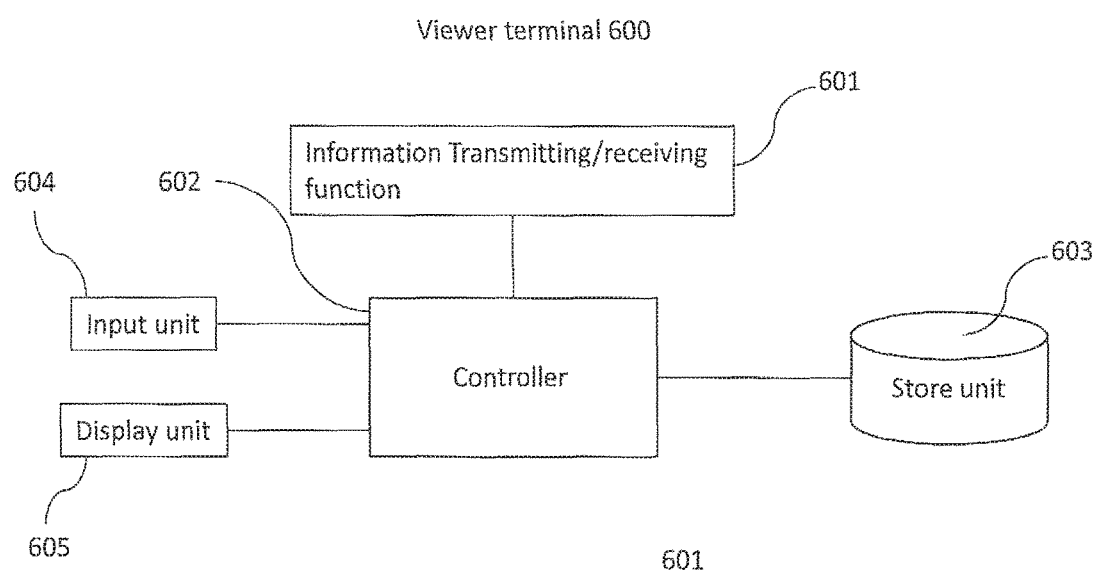

FIG. 3 (*a*) illustrates the arrangement of the server device and FIG. 3 (*b*) illustrates the arrangement of the viewer terminal.

Specifically, the server device 400 includes an information transmitting/receiving function 401 that is enabled to exchange the communications with the player terminal 300 and the viewer terminal 600, respectively The store unit 403 included in the server device 400 stores the application program 405 that runs on the information sharing system of the present invention and may be downloaded to the player terminal in response to the receipt of the request submitted from the player terminal 300.

The store unit 403 also stores the golf play facilities database 404 that contains the information related to the golf play facilities and that may be transmitted to the player terminal in response to the receipt of the request submitted from the player terminal.

The golf play facilities database 404 contains the golf play facilities name table having therein the entries for the golf play facilities names 404*a* the golf course name table 404*b* having therein the entries for the golf courses available within the golf play facilities, the holes table 404*c* having therein the entries for the number of holes therein, the number of holes table 404*d* having therein the entries for the hole number and the number of pars table 404*e* having therein the entries for the number of pars stroked up to the hole.

In addition, the golf play facilities database 404 contains the two types of the course data tables each containing the course data including the target coordinates for the golf ball to travel up to the green that is transmitted to the player terminal 300 in response to the receipt of the request submitted from the player terminal 300 and may be required for computing the distance that remains for the golf ball to travel from its current position up to the green, the one type being the service supplier's course data table 404*f* which contains the course data to be entered and supplied by the service supplier using the system of the present invention and the other type being the golf player's course data table 404g which contains the course data entered by the golf player 200. The target coordinates for the golf ball to travel up to the green contained in the course data are associated with the hole number contained in the number of the table 404d.

The golf play facilities database 404 contains a score table 404h having the entry for the golf scores of the golf player 200 that may be submitted by the player terminal 300.

The server device 400 further includes a golf play facilities selecting function 406 that is enabled to select the appropriate golf play facilities in response to the receipt of the request to search for any available golf play facilities that has been submitted from the player terminal 300.

The server device 400 further includes a scorecard ID generating function 407 that is enabled to generate a scorecard ID for the golf player 200 in response to the receipt of the request to generate a scorecard ID submitted from the player terminal 300.

The scorecard generating function 407 is enabled to generate the master ID described above and the slave ID formed by the code which identifies the player terminal that has requested the server device to generate the golf scorecard and a scorecard ID consisting of the combination of the master ID and the slave ID.

The generated scorecard ID will be transmitted to the player terminal 300 and when it is stored, it will be associated with each of the data items contained in each respective one of the tables in the golf play facilities database 404.

The server device 400 further includes a share password generating function 408 that will be enabled to generate a share password to be transmitted to the other player terminals in response to the receipt of the request to cause the golf scorecard created by the scorecard creating function 308 to be shared by the other golf players that has been submitted from the one particular player terminal which has requested the server device 400 to create the golf scorecard.

The share password that is generated by the share password generating function 408 is provided so that the golf scorecard created by the scorecard creating function 308 can be shared by the other golf players. For this purpose, the share password is associated with the master ID created by the scorecard ID generating function 407.

The server device 400 further includes a share password authenticating function that is enabled to authenticate a share password in response to the receipt of the request to authenticate the share password submitted from each of the other player terminals.

The share password authenticating function 409 will be enabled to match the master ID that is the same as the master ID associated with the share password received from each of the other player terminals against the master ID's associated with the scorecard ID contained in each respective one of the tables in the golf play facilities database 404.

If it is found that the same master ID has been matched, the scorecard ID generating function 407 will be enabled to generate a slave ID that is formed by the code that identifies any one of the other player terminals which wants to use the created golf scorecard and generate a scorecard ID for any one of the other player terminals that includes the combination of the generated slave ID and the matched master ID.

The scorecard ID thus generated for any one of the other player terminals will be transmitted to each of the other player terminals and will be entered into each respective one of the tables in the golf play facilities database 404 after it has been associated with the data in each respective one of the tables.

The server device 400 further includes a score published terminal information generating function 410 that is enabled to receive, from the one particular player terminal, the request to allow one or more viewers 500 who want to view the golf scorecard for the one particular golf player 200 and respond to the above request in order to create a scorecard published terminal information that allows the one or more viewers 500 to view the above scorecard on the respective viewer terminal or terminals 600 over the communications network 700 and transmit the same to the one particular player terminal.

One example of the score published terminal information may be the published URL that is written by the HTML format data. The scorecard published information thus generated will be transmitted to the one particular player terminal and will be received by the information transmitting/receiving function 301 which will then transmit the same to the viewer terminal or terminals 600 for the one or more viewers 500.

The server device 400 further includes a score gathering function 411 that will be enabled to gather the golf score contained in the score table 404a in response to the receipt of the request submitted from the player terminal 300.

The server device further includes an estimated information gathering function 412 that is enabled to gather the estimated information for the course data including the target coordinates up to the green and which has been submitted from the player terminal 300.

The units and functions that have been described so far are placed under the control of the controller 302, which may include CPU and main memory.

The viewer's terminal 600 is an information communications apparatus that may include a personal computer, a mobile phone, a smartphone, a tablet terminal and the like, and includes an information transmit/receive function 601 that can be enabled to exchange the communications with the server device 400 and the player terminal 300.

The viewer terminal 600 includes an input unit 604 such as keyboard, a touch panel and the like, a display unit 605 such as an LC display, an LC panel and the like on which the information can appear, and a store unit such as an internal storage and the like on which the information can be stored.

The units and functions that have been described so far are placed under the control of the controller 302, which may include CPU and main memory.

First Embodiment

By referring to FIGS. 4 through 13, an embodiment of the present invention is described below, in which the information sharing system of the present invention is used to allow the golf players to share the golf course data including the target coordinates for the golf ball to travel up to the green and which will be required in computing the distance that remains for the golf ball to travel from its current position up to the green.

Figure 4:
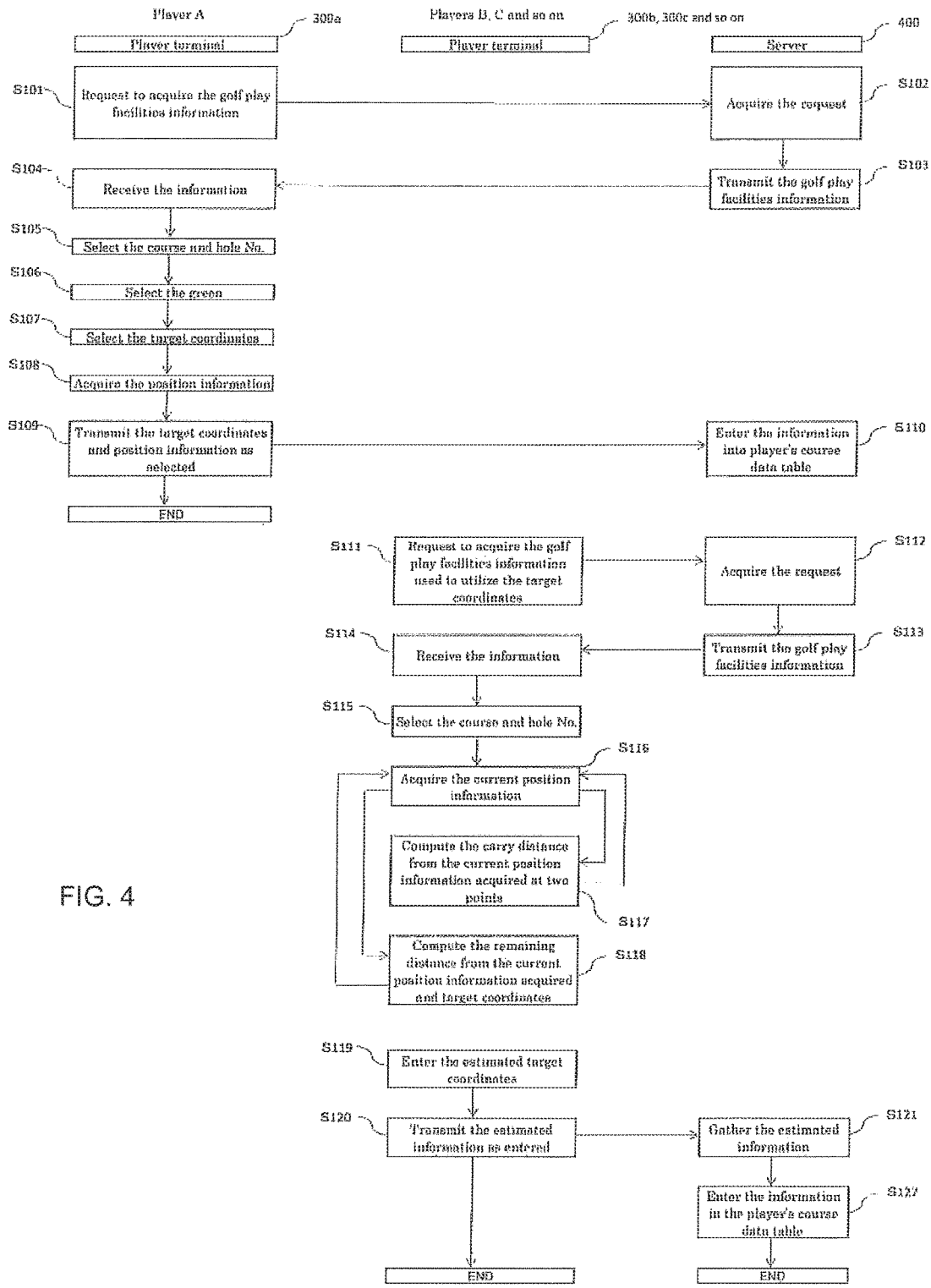
FIG. 4 is a flowchart diagram of the steps that are followed by the system to allow a plurality of golf players to share the target coordinates up to the green by using the information sharing system in accordance with one embodiment of the present invention.

FIG. 4 is a flowchart diagram that includes the steps which are followed to permit the golf data including the target coordinates up to the green to be shared among the golf players.

The golf player 200 submits a request to download the application program 405 running on the information sharing system 100 of the present invention by accessing the sever device 400 from the golf player's player terminal 300.

The server device 400 transmits the application program 405 to the player terminal 300 in response to the receipt of the request submitted from the player terminal 300.

The player terminal 300 which has acquired the application program 405 is ready to run the application program 405.

Figure 5:
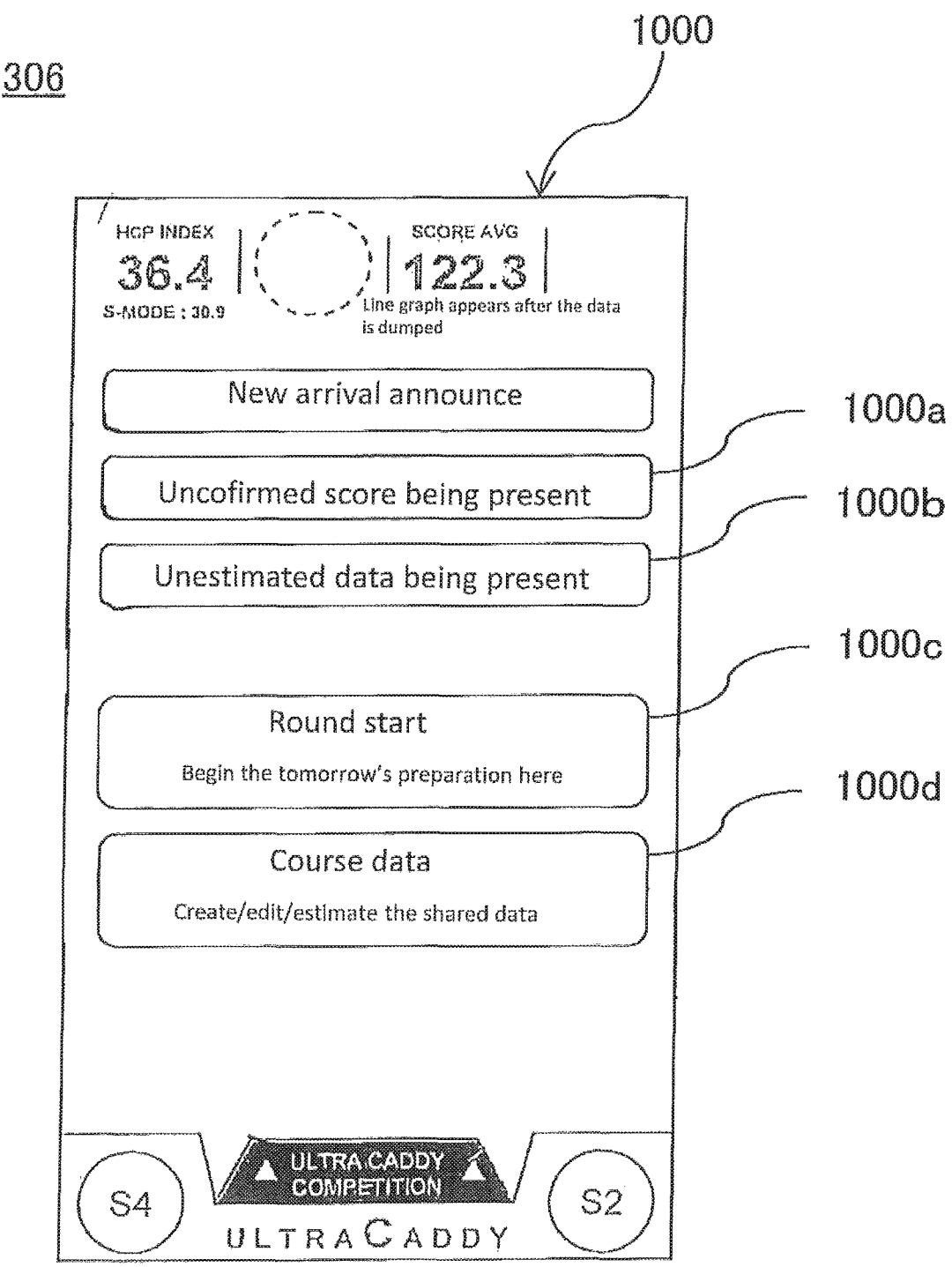
FIG. 5 illustrates one example of the menu screen on the information sharing system in accordance with one embodiment of the present invention.

When the application program 405 has been run, the menu select screen 1000 will appear on the display unit 306 as shown in FIG. 5.

In order to allow the golf players to share the golf course data, it is required that one particular golf player 200a will previously set the golf course data. To this end, the one particular golf player 200a will select the course data creation indicating section 1000d on the menu select screen.

After the course data creation indicating section 1000d has been selected, the course data create/estimate selecting screen 1001 will appear, which asks the golf player to set, edit or estimate the golf course data.

The course data create/estimate selecting screen 1001 includes a new course data create indicating section 1001a on which the target coordinates up to the green can be set and a course data estimate indicating screen 1001b on which any one of the other golf players 200b, 200c and so on can estimate the above target coordinates up to the green.

Figure 6:
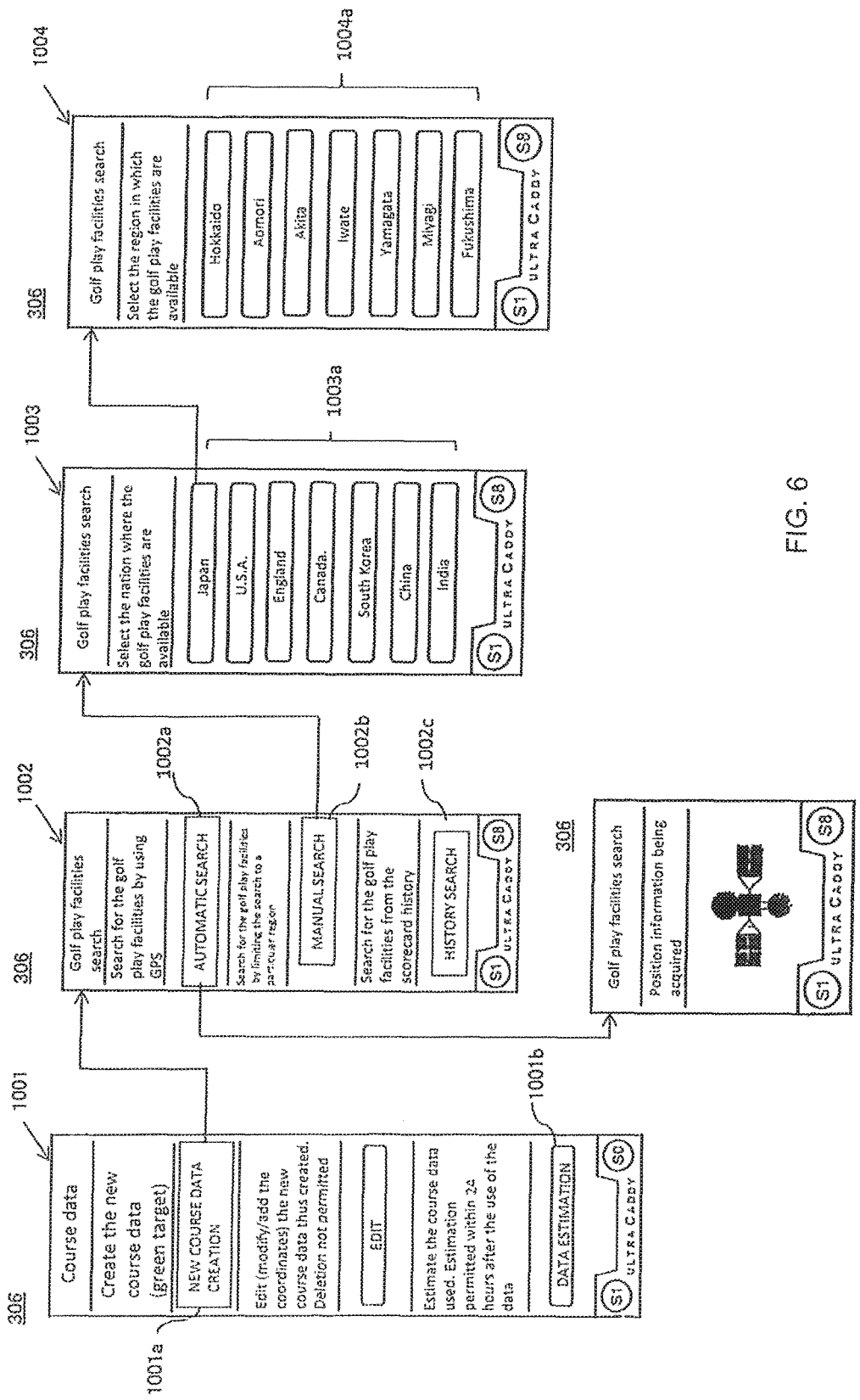
FIG. 6 represents the example of the menu screen shown in FIG. 5 on which one particular golf player can select one of the golf play facilities that can be used to set the target coordinates up to the green.

When the one particular golf player 200a has selected the new course data create indicating section 1001a, a golf play facilities searching screen will appear on the display unit 306, which asks the golf player 200a to search for the golf play facilities that can be used to set the target coordinates up to the green as shown in FIG. 6.

The golf player 200a selects any one of the automatic search indicating section 1002a, the manual search indicating section 1002b and the history search indicating section 1002c, all of which appear on the golf play facilities searching screen 1002.

When the automatic search indicating section 1002a is selected, the position information acquiring function 307 on the player terminal 300a will be enabled to acquire the position information of the player terminal 300a by way of the satellite communications with the GPS satellite 900. Then, a position information acquire executing screen shown in FIG. 6 will appear on the display unit 306. The position information thus acquired will be transmitted to the server device 400 together with the indicating information for asking the golf player to select the automatic search indicate section 1002a in order to search for the golf play facilities (S101 in FIG. 4)

The golf play facilities selecting function 406 included in the server device 400 acquires the position information together with the indicating information (S102), and selects the data (ten data items, for example) that shows the golf course nearest to the received position information from each respective one of the golf play facilities name table 404a, the course name table 404b, the number of holes table 404c and the hole number table 404d, all of which are contained in the golf play facilities database 404, and the golf play facilities data thus selected will be transmitted to the player terminal 300a (S103).

Figure 7A:
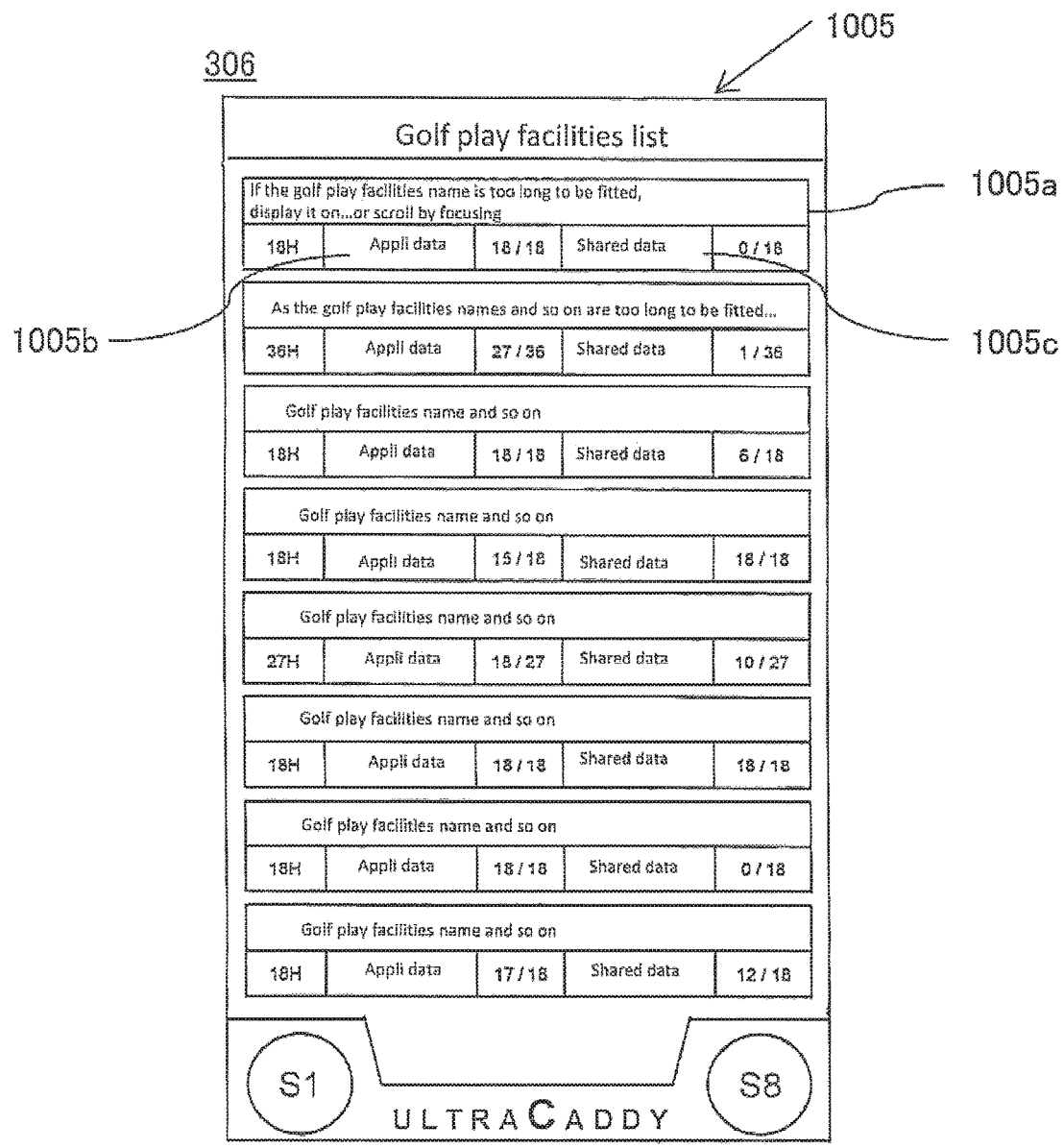
Figure 7B:
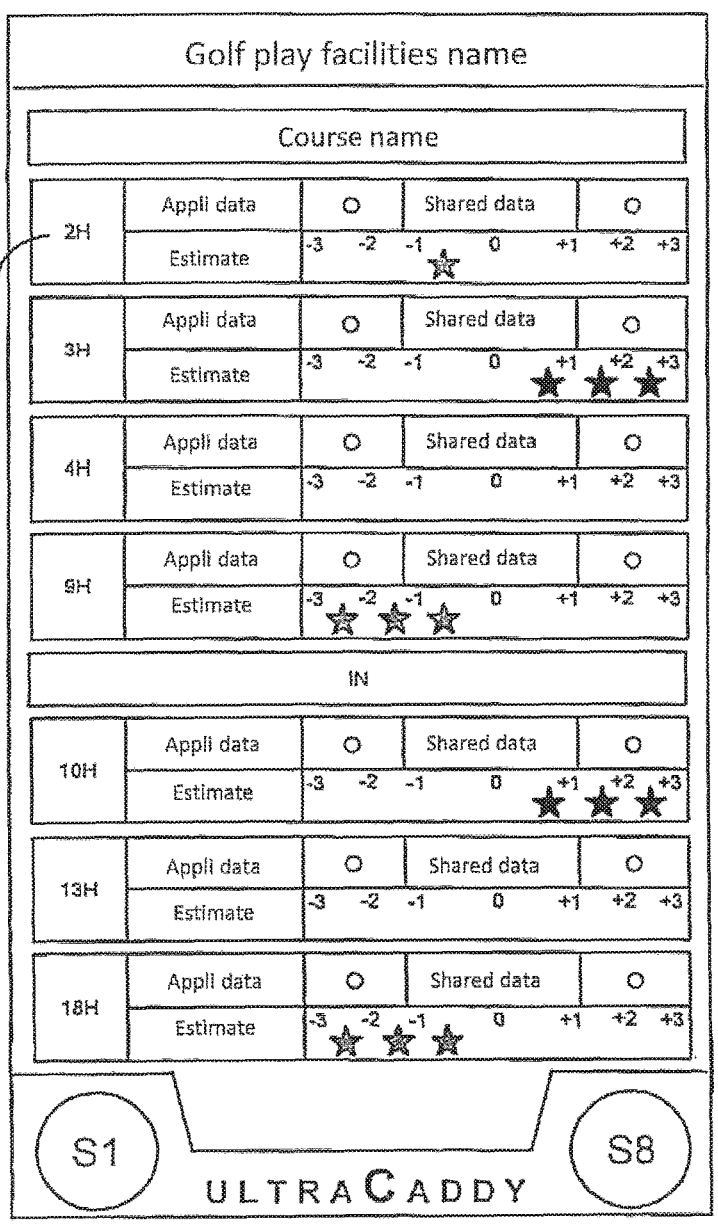

The golf play facilities list screen 1005 shown in FIG. 7 (a) will appear on the display unit 306 on the player terminal 300a (S104).

If the manual search indicate section 1002b is selected, the nation name select screen on which the golf player is asked to select the nation name as shown in FIG. 6 will appear on the display unit 306.

The golf player 200a is asked to select the nation name 1003a to search for the golf play facilities from the list of the nation names 1003a appearing on the nation name selecting screen 1003. In this embodiment, "Japan" has been selected as the nation name 1003a.

When the nation name 1003a is selected, the region name selecting screen 1004 shown in FIG. 6, on which the golf player is asked to select the region, will appear on the display unit 306.

The golf player 200a may select the region name 1004a to search for the golf play facilities from the list of the region names 1004a appearing on the region name selecting screen 1004. In this embodiment, "Hokkaido" has been selected as the region name 1004a.

When the region name 1004a is selected, the search condition information for the nation name 1003a and the region name 1004a as selected above will be transmitted to the server device 400 together with the indicating information that asks the golf player to select the manual search indicating section 1002b and then to search for the golf play facilities (S101)

The golf play facilities selecting function 406 included in the server device 400 will be enabled to acquire the search condition information and the indicating information described earlier (S102), selecting the golf play facilities data (ten data items, for example) that satisfies the search condition information from each respective one of the golf play facilities table 404a, the course name table 404b, the number of holes table 404c and the hole number table 404d and transmitting the golf play facilities data thus selected above to the player terminal (S103).

The golf play facilities list screen 1005 shown in FIG. 7 (a) will appear on the display unit 306 on the player terminal 300a (S104).

If the history search indicating section 1002c has been selected, the indicating information that asks the server device 400 to search for any appropriate golf play facilities by selecting the history search indicating section 1002c will be transmitted to the server device 400 (S101).

The golf play facilities selecting function 406 included in the server device 400 will be enabled to acquire the above indicating information (S102), and select the entries for the golf play facilities that are contained in the score table 404h (ten entries, for example) and which have been used in the past by referencing the golf scores in the golf play facilities that have been used by the golf player 200a in the past. Then, the entries for the golf play thus selected will be transmitted to the player terminal 300a (S103).

The golf play facilities list screen 1005 shown in FIG. 7 (a) will then appear on the display unit 306 in the player terminal 300a (S104).

The data 1005a for the golf play facilities appearing in the golf play facilities list screen shown in FIG. 7 (a) includes the entries for the golf play facilities names, the golf course names, the number of holes, the hole number, the number of pars up to the hole and the like, the entries of which are contained in each respective one of the tables in the golf play facilities database 404. There are two types of the golf play facilities data. One type is the service supplier's golf play facilities data 1005b that is entered by the service supplier and the other type is the golf player's golf play facilities data 1005c that is entered by the golf player 200.

In addition to the entries for the golf play facilities names, the golf course names, the number of holes, the hole number, the number of pars up to the hole and the like that are entered by the service supplier as described above, the service supplier's golf play facilities data 1005b includes the entries for the course data including the target coordinates that are required in computing the distance that remains for the golf ball to travel from the current position up to the green, which are also entered by the service supplier.

In addition to the entries for the golf play facilities names, the golf course names, the number of holes, the hole number, the number of pars up to the hole and the like that have been entered by the golf player 200 as described above, the golf player's golf play facilities data 1005c also includes the entries for the course data including the target coordinates that are required in computing the distance that remains for the golf ball to travel from the current position up to the green, which are also entered by the service supplier as well as the estimated information supplied by several golf players 200b, 200c and so on in respect of the above target coordinates up to the green that have been entered by the service supplier and the golf player 200.

The golf player 200 may select the appropriate entry for the golf play facilities data 1005a that the golf player 200 wants to use from several entries for the golf play facilities data 1005a appearing on the golf play facilities list screen 1005.

When the appropriate entry for the golf play facilities data 1005a is selected, the hole list screen 1006 will appear on the display unit 306, asking the golf player to select the hole in the golf course that may be used in setting the above target coordinates up to the green from the entries for the golf courses contained in the golf play facilities data selected by the golf player as shown in FIG. 7 (b).

The golf player 200a may select the hole data 1006a that the golf player wants to use from several entries for the hole data 1006a contained in the hole list screen 1006 (S105).

Figure 8A:
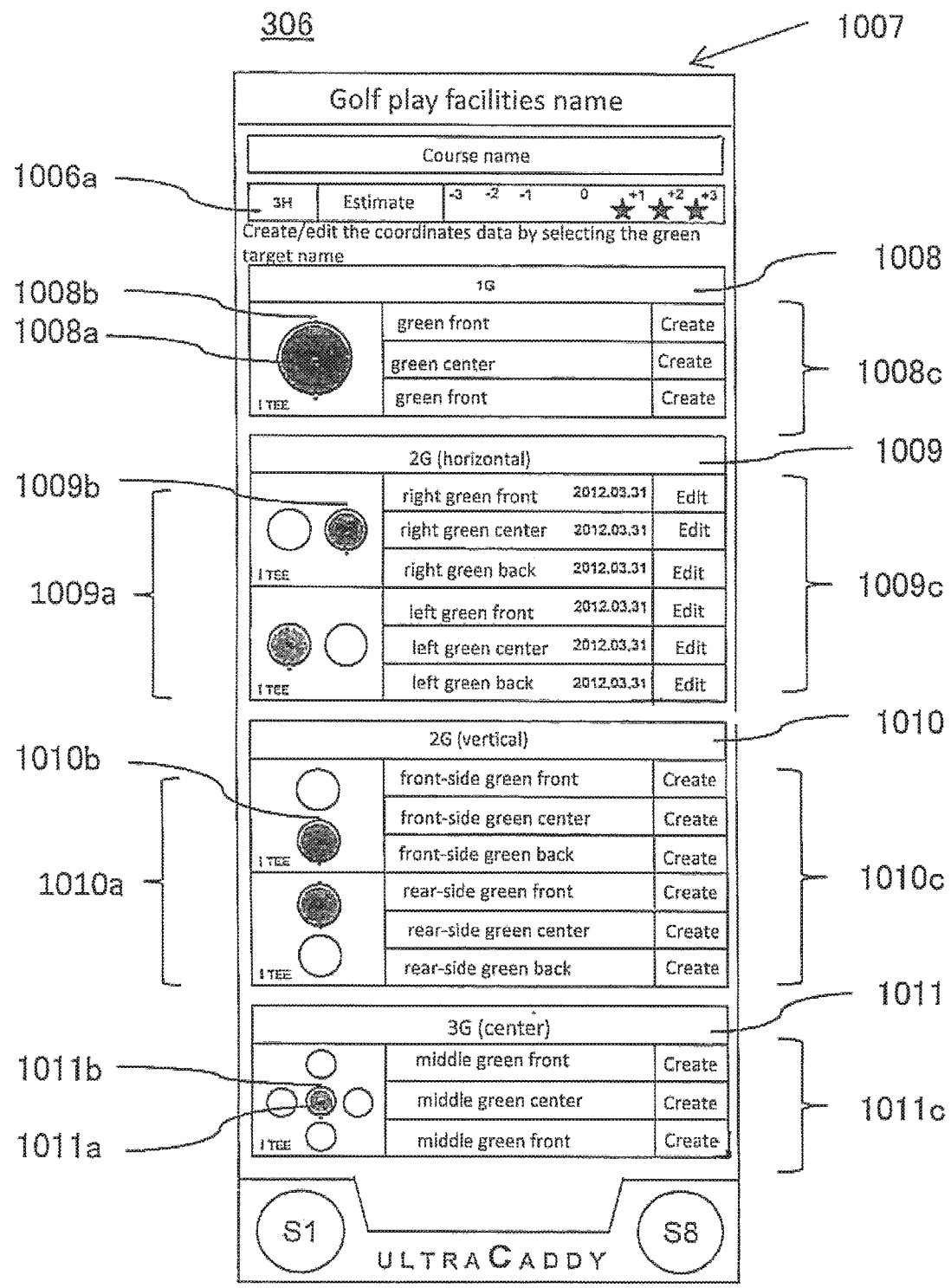
FIG. 8A illustrates one example of the screen on one particular player terminal that is used to set the target coordinates up to the green and FIG. 8B illustrates one example of the screen on the player terminal on which the target coordinates up to the green as selected can be measured.
Figure 8B:
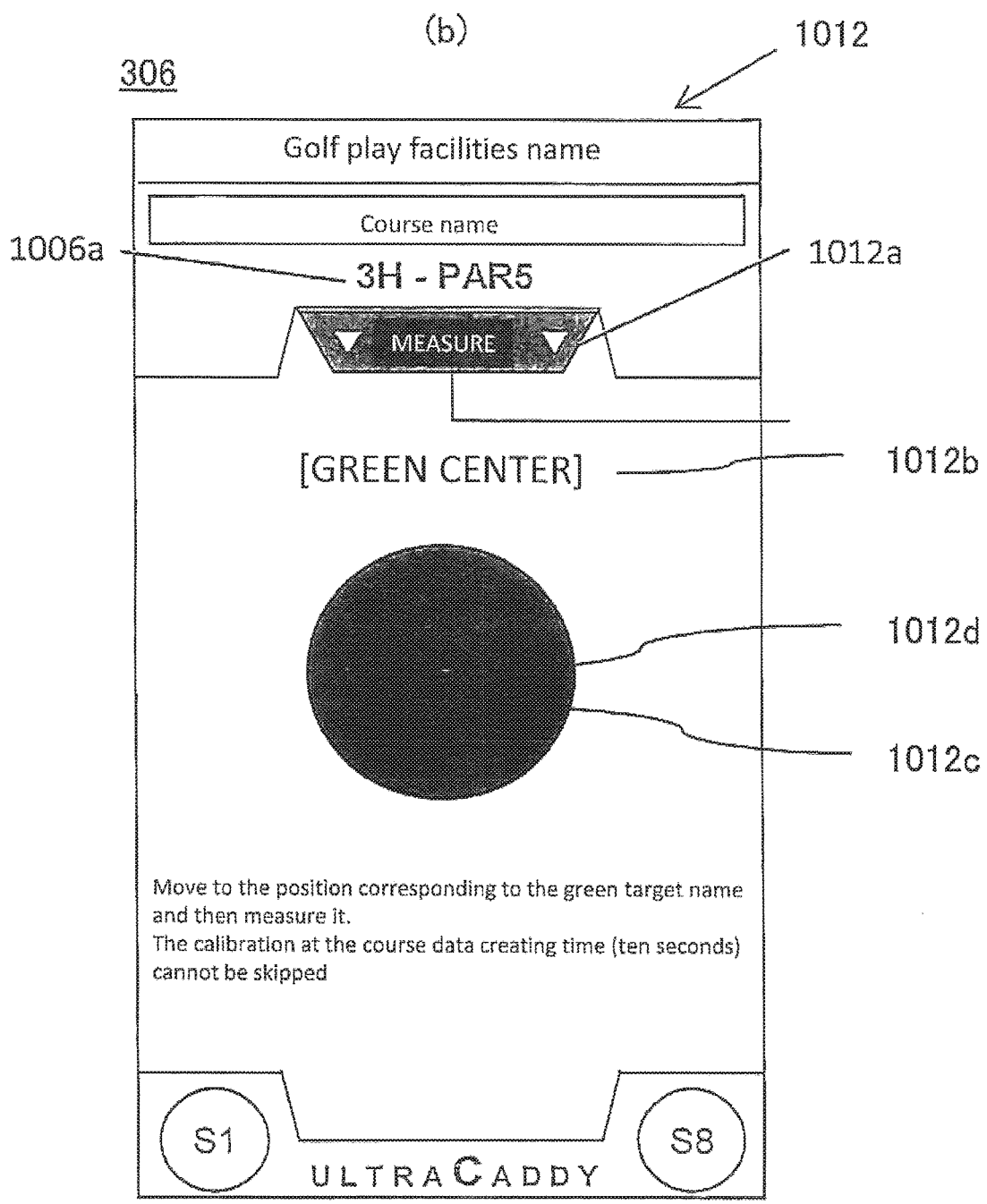

When the hole data 1006a is selected, the target coordinate setting screen 1007 will appear on the display unit 306, asking the golf player to select the target coordinates up to the green as shown in FIG. 8 (a).

The golf player 200a may select one green display section from the green display sections 1008, 1009, 1010 and 1011. In this step, the golf player 200a may select one green icon from the green icons 1008a through 1011a by referencing the green position indicated on the hole outside view (S106).

For example, if it is assumed that the green position is set to two positions on the hole outside view and that the green that can actually be used is located on the lower position, the golf player 200a may select the green icon 1010a that appears above the green display section 1010.

After the green icon has been selected, the golf player 200a may select the target coordinates name that is required in measuring the distance that remains for the golf ball to travel from its current position up to the green by referencing the target coordinates icons 1008b through 1011b appearing on the green icons (S107).

If the green icon 1010a appearing above the green display section 1010 is selected, the golf player 200a may select one target coordinates name, for example "front-side green front", from the target coordinates name indicating sections 1010c that correspond to the target coordinates icon 1010b by referencing the three-position target coordinates icon 1010b appearing on the green icon 1010a.

It should be understood, however, that the word "create" indicated in the target coordinates name indicating sections 1008c through 1011c means that the target coordinates up to the green have not yet been set but are to be set newly. Any one of the golf players 200 can set the target coordinates up to the green as the new one.

It should also be understood that the word "edit" indicated in the target coordinates name indicating sections 1008c through 1011c means that the target coordinates up to the green that have already been set can be set again and edited accordingly. Only the gold player or golf players who have already set it can be allowed to edit it accordingly.

In this embodiment, it is apparent that each of the target coordinates icons is made to appear in three positions on the green icon, and therefore a total of 18 target coordinates name indicating sections are provided. It should be understood, however, that the target coordinates name indicating sections can be more detailed and increased by modifying the respective display formats of the green icon and target coordinates icon, and then can be made to appear on the green display section.

After the target coordinates name indicating sections is selected, the target coordinates measuring screen 1012 on which the target coordinates shown in FIG. 8 (b) have already been set will appear on the display unit 306. On the target coordinates measuring screen 1012, the target coordinates measure indicating section 1012a, the selected target coordinates name 1012b, the green icon 1012c and the target coordinates icon 1012d will appear.

If the target coordinates name shown in FIG. 8 (a) is to be selected, more specifically, for example, if the green icon 1008a has been selected and then the target coordinates name indicating section 1008c "green center" has been selected, the target coordinates name 1012b "green center", the green icon 1012c and the target coordinates icon 1012d located in the center of the green icon 1012c will appear on the target coordinates measuring screen 1012.

The golf player 200a will move to the actual green position that corresponds to the target coordinates icon 1012d located in the center of the green icon 1012c where the golf player 200a will then select the target coordinates measure indicating section 1012c.

Figure 9A:
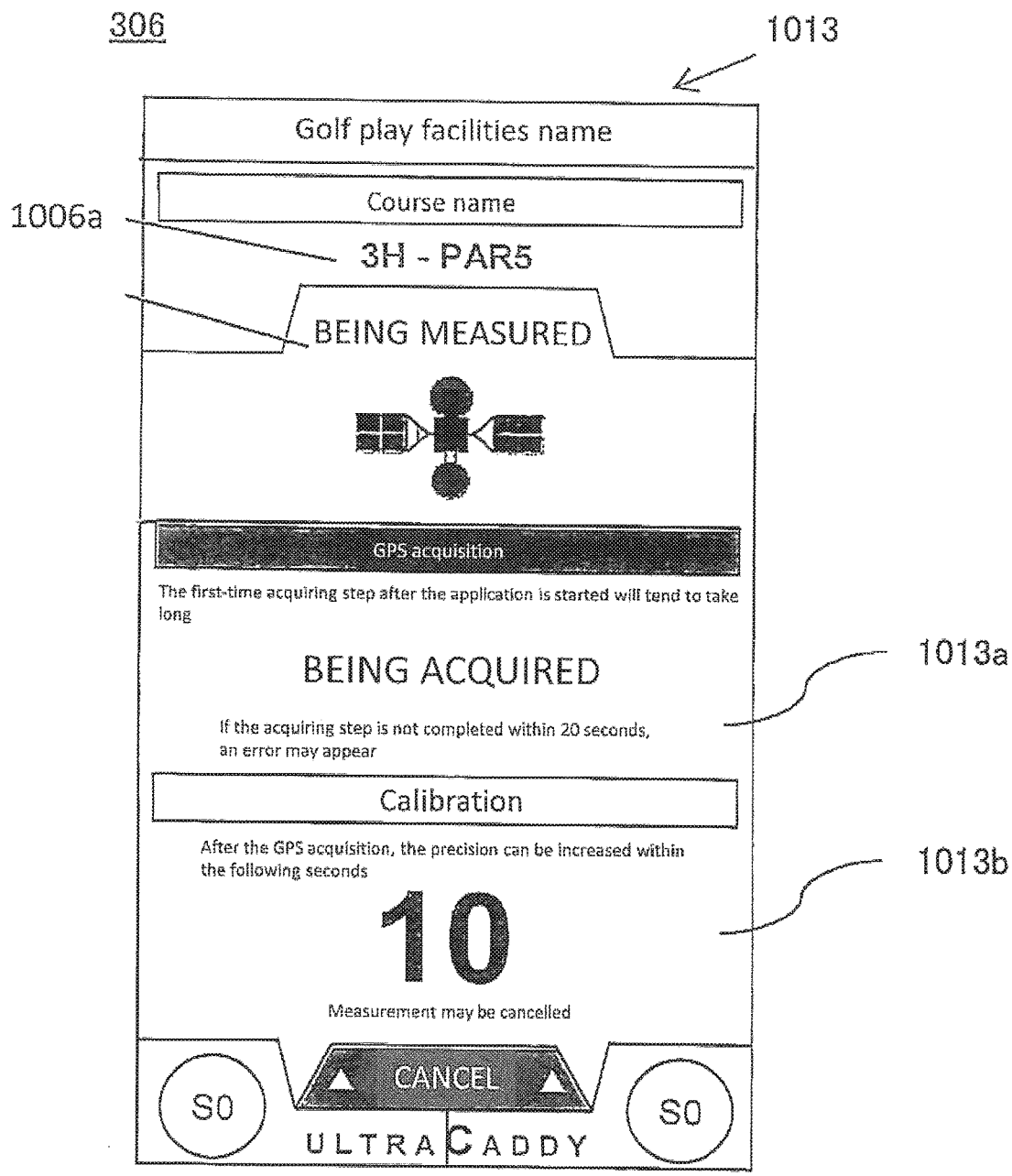
FIG. 9A illustrates one example of the screen on the one particular player terminal on which the target coordinates up to the green as selected are in the process of being used to measure the current position and FIG. 9B illustrates one example of the screen on the one particular player terminal on which the current position measurement has been completed and the current position as measured in FIG. 9A is in the process of being corrected.
Figure 9B:
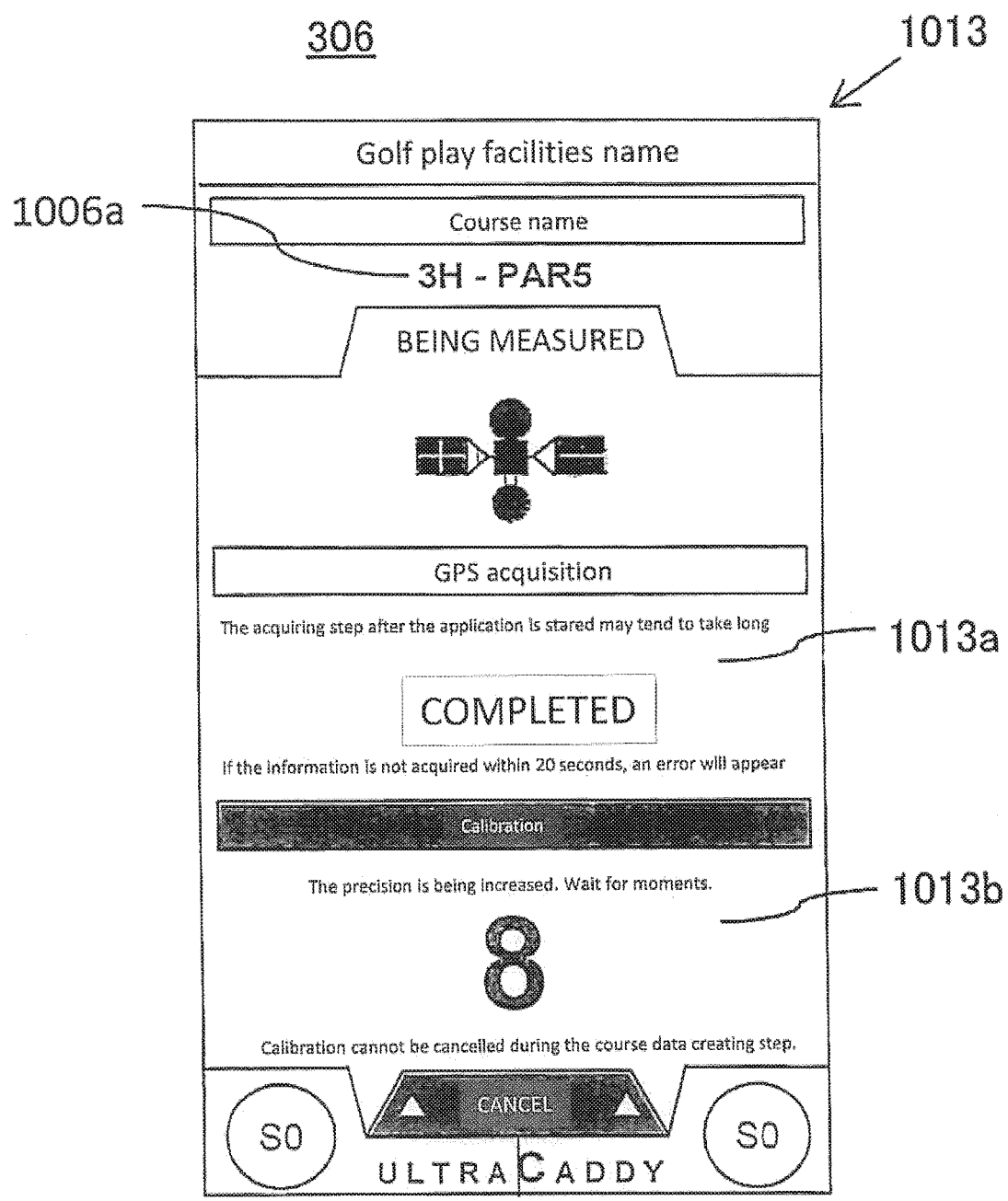

When the target coordinates measure indicating section 1012a has been selected, the current position information measuring screen 1013 will appear on the display unit 306, on which the position information of the player terminal 300a that is located in the actual position on the green that corresponds to the target coordinates icon 1012d shown in FIG. 9 (a) will be acquired (S108). The current position information measuring screen 1013 includes the position information measure display section 1013a which provides the state in which the measurement is in the process of being made at the position of the player terminal 300a and the position correction display section 1013b which provides the state in which the measured position is in the process of being corrected.

The position information acquiring function 307 for the player terminal 300a is enabled to acquire the player terminal's position information by exchanging the satellite communications with the GPS satellite 900

The position information acquiring function 307 has the capability for correcting the position information for the player terminal 300a thus acquired. If the position information is to be corrected, the state in which the position information thus acquired as shown in FIG. 8 (a) is in the process of being corrected will appear on the position correction indicating section 1013b. In this embodiment, the length of the time required for this correction is set to ten seconds, but this time may be set as required appropriately.

The position information acquiring function 307 is enabled to transmit the position information for the player terminal 300a thus acquired to the server device 400 (S109). The green icon 1012c, the target coordinates icon 1012d and the target coordinates name 1012b that have been selected as described are also provided as the target coordinates up to the green from the player terminal 300a to the server device 400 (S109).

The target coordinates up to the green thus received by the server device 400 will be entered into the golf player's course data table 404g (S110). In this step, the target coordinates up to the green will be entered after they have been associated with the hole number in the entry for the hole data 1006a thus selected and entered in the hole number table 404d in the golf play facilities database 404. The target coordinates up to the green thus entered will be utilized as the player's golf play facilities data 1005c by the golf players 200b, 200c and so on.

The position information received by the server device 400 as described above will be entered in the player's course data table 404g as the target coordinates measured information (S110). In this step, this information is entered in the table after it has been associated with the entry for the hole number entered as the hole data 1006a thus selected and which is entered into the hole number table 404d in the golf play facilities database 404.

The position information for the player terminal 300a which is located in the actual green position that corresponds to the position of the above target coordinates icon 1012d, that is, the target coordinates measured information that has thus been entered may be utilized by the other golf players 200b, 300c and so on as the player's golf play facilities data 1005c together with the target coordinates up to the green as described above.

The target coordinates up to the green and the target coordinates measured information may also be set by the service supplier. When they are set by the service supplier, this will be performed on the terminal for the service supplier, although this is not shown. The target coordinates up to the green and the target coordinates measure information that have been set by the service supplier will be entered into the service supplier's course data table 404f.

The target coordinates up to the green and the target coordinates measured information thus set by the service supplier may also be utilized by the golf player 200 as the service supplier's golf play facilities data 1005b.

If the target coordinates up to the green and the target coordinates measure information set by the one particular golf player 200a as described above are utilized by the other golf players 200b, 200c and so on, the application program 405 that has been downloaded onto the player terminals 300b, 300c and so on may be started, causing the golf play facilities searching screen 1002 to appear on the display unit 306.

Figure 10B:
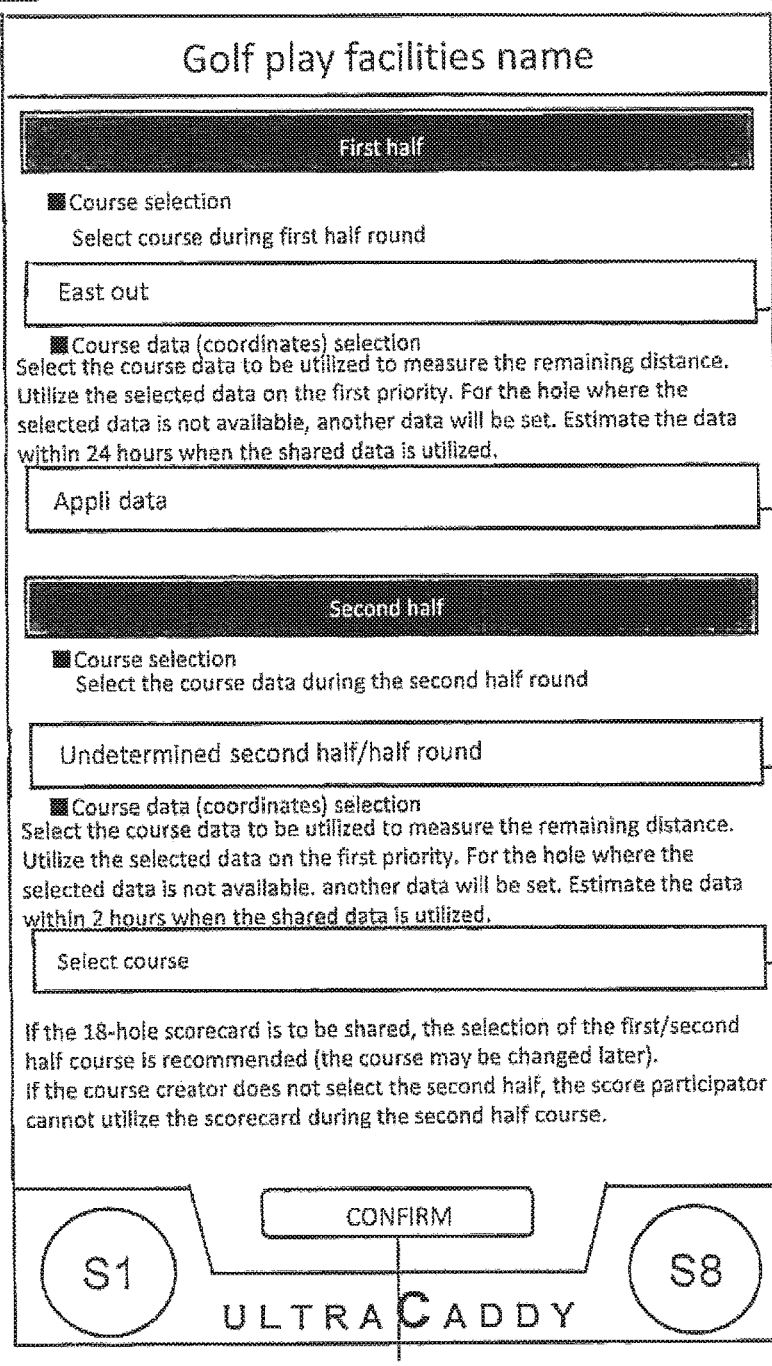

Any one of the automatic search indicating section 1002a, the manual search indicating section 1002b and the history search indicating section 1002c that have been described above may be selected so that the golf play facilities list screen shown in FIG. 10 (a) can appear on the display unit 306 (S111, S112, S113, S114).

The golf players 200b, 200c and so on may select the appropriate golf play facilities data 1005c that they want to utilize from the entries for the several golf play facilities data 1005a appearing on the golf play facilities list screen 1005.

When the entry for the appropriate golf play facilities data 1005a is selected, the round condition selecting screen 1014 will appear on the display unit 306 on each of the player terminals 300b, 300c and so on as shown in FIG. 10 (b), asking them to enter the golf course round condition.

The round condition selecting screen 1014 provides the first round selecting section 1014a for selecting the round condition for the first half of the golf course and the second round condition selecting section 1014b for selecting the round condition for the second half of the golf course.

The first round condition selecting section 1014a and the second round condition selection section 1014b provide the options that may be chosen to select the out-course or the in-course, for example.

In addition, the round condition selecting screen 1014 provides the first course data selecting section 1015a for selecting the course data including the target coordinates up to the green that is used during the first half of the course and the second course data selecting section 1015b for selecting the course data including the target coordinates up to the green that is used during the second half of the course.

On the first course data selecting section 1015a and the second course data selecting section 1015b, the service supplier's golf play facilities data 1005b or the player's golf play facilities data 1005c that have been described above may be selected (S115).

When the selection has been made on the first round selecting section 1014a and the second round selecting section 1014b as well as the first course data selecting section 1015a and the second course data selecting section 1015b, the information entering section 1016 may be selected, The information entering steps are thus completed.

It is noted that the golf players 200b, 200c and so on may utilize the target coordinates up to the green and the target coordinates measured information that have been entered by the service supplier or the golf player 200.

If the service supplier's golf play facilities data 1005b is selected when the selection is made on the first course data selecting section 1015a and the second course data selecting section 1015b, the target coordinates up to the green and the target coordinates measured information will be provided from the service supplier's course data table 404f that resides on the server device 400, and if the player's golf play facilities data 1005c is selected, the target coordinates up to the green and the target coordinates measured information will be provided from the player's course data table 404f that resides on the server device 400.

Figure 11A:
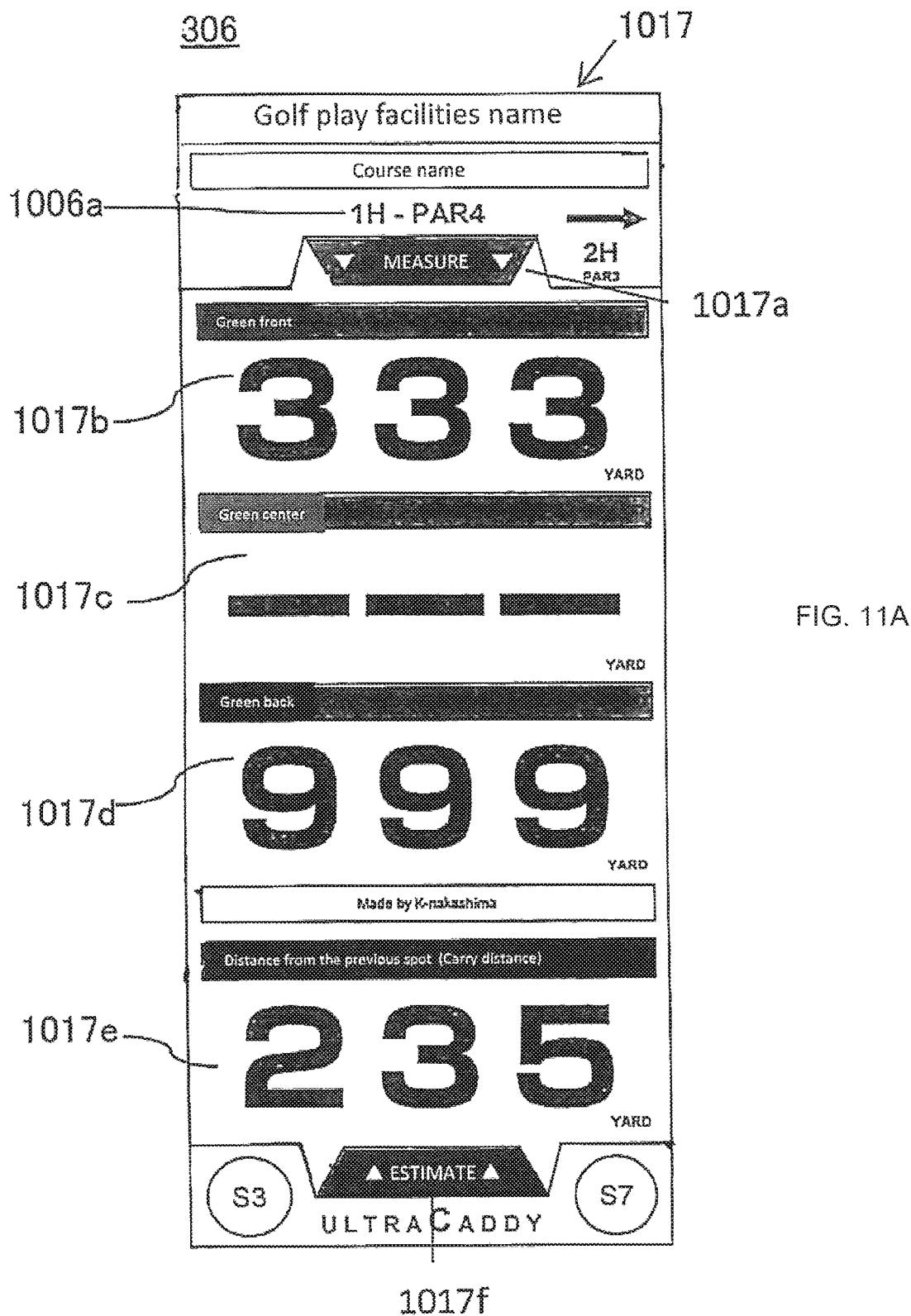
FIG. 11A illustrates one example of the screen on any one of the other player terminals on which the position information presented by the one particular player terminal from the selected target coordinates up to the green is used to measure the distance traveled by a stroked golf ball as well as the distance that remains for the golf ball to travel to the target coordinates up to the green.
Figure 11B:
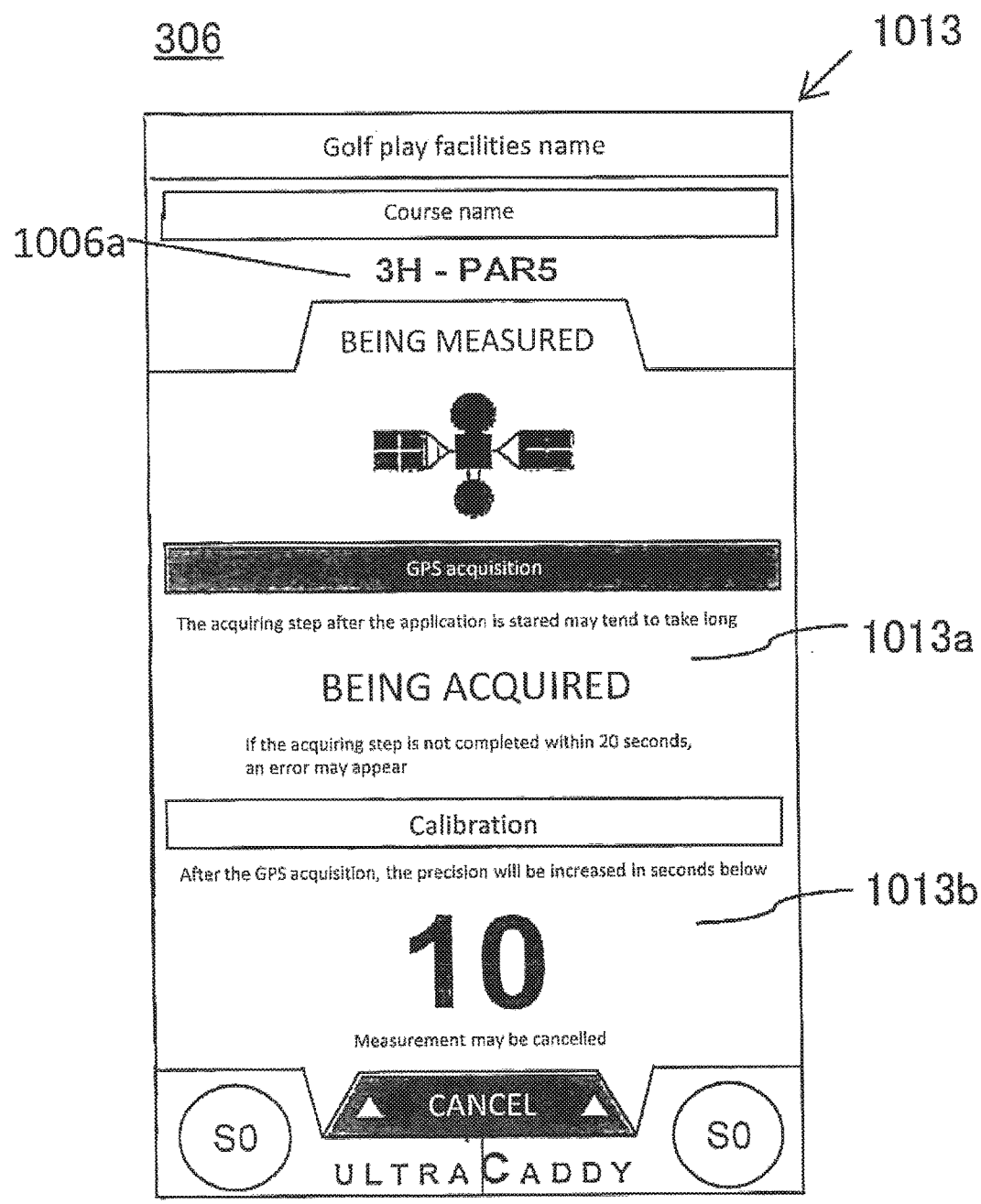
FIG. 11B illustrates one example of the screen on any one of the other player terminals on which the current position is in the process of being measured and FIG. 11C illustrates one example of the screen on which the current position measurement has been completed and the completed current position is then in the process of being corrected.
Figure 11C:
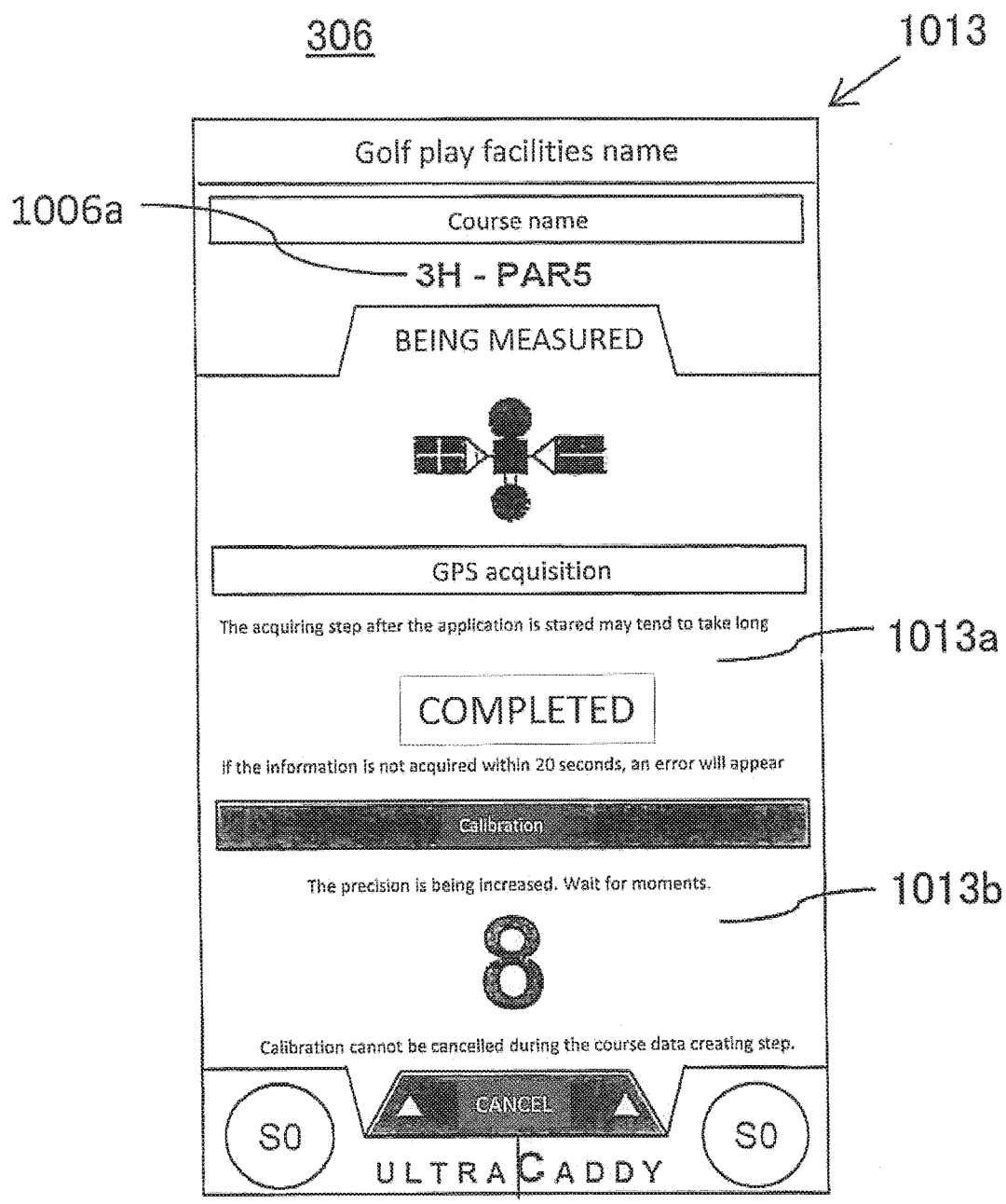

When the information entering section 1016 is selected, the remaining distance/carry distance measuring screen 1017 shown in FIG. 11 (a) will appear on the display unit 306 on each of the player terminals 300b, 300c and so on. The remaining distance/carry distance measuring screen 1017 provides the measure indicating section 101a, the first remaining distance display section 1017a, the second remaining distance display section 1017c, the third remaining distance display section 1017d and the carry distance display section 1014e.

On each of the remaining distance display sections, the distance that remains for the golf ball to travel from its current position to the target coordinates up to the green will be provided by using the position information of the player terminal 300a located in the actual green position that corresponds to the position of the target coordinates icon 1012, that is, the target coordinates measured information described above.

In the example illustrated, the first remaining distance display section 1017b provides the distance from the golf ball's current position for the golf players 200b, 200c and so on to the target coordinates up to the green in the target coordinates name "green front".

In the second remaining distance display section 1017c, the distance from the golf ball's current position for the golf players 200b, 200c and so on to the target coordinates up to the green is not provided because the target coordinates name is not set.

In the third remaining distance display section 1017d the distance from the golf ball's current position for the golf players 200b, 200c and so on to the target coordinates up to the green in the target coordinates name "green back" is provided.

The carry distance display section 1017e provides the distance traveled by the golf ball for each of the golf players 200b, 200c and so on.

The distance that remains for the golf ball to travel from its current position to the target coordinates up to the green is computed by the remaining distance computing function 310 provided in each of the player terminals 300b, 300c and so.

In FIG. 11 (a), if the measure indicating section 1017a is selected, the current position information measuring screen 1013 will appear on the display unit 306, on which the current information of each of the player terminals 300b, 300c and so located in golf ball's position shown in FIG. 11 (b) can be acquired.

The position information acquiring function 307 in each of the player terminals 300b, 300c and so on is enabled to acquire the position information for each of the player terminals 300b, 300c and so on by exchanging the satellite communications with the GPS satellite (S116).

The position information acquiring function 307 provides the capability of correcting the position information for each of the player terminals 300b, 300c and so on. In correcting the position information, the state in which the acquired position information shown in FIG. 11 (c) is in the process of being corrected is provided on the position information display section 1013b.

The remaining distance computing function 310 is then enabled to acquire the position information for the player terminal 300a as measured by the golf player 200a from the player's course data table 404, that is, the target coordinates measured information described above, and is then enabled to use the target coordinates measured information and the current position information for each of the player terminals 300b, 300c and so on in order to compute the distance from the current position for each of the player terminals 300b, 300c and so on to the position for the player terminal 300a as measured above as the distance that remains for the golf ball to travel from the golf ball's current position for each of the golf players 200b, 200c and so on to the target coordinates up to the green (S118).

Figure 12:
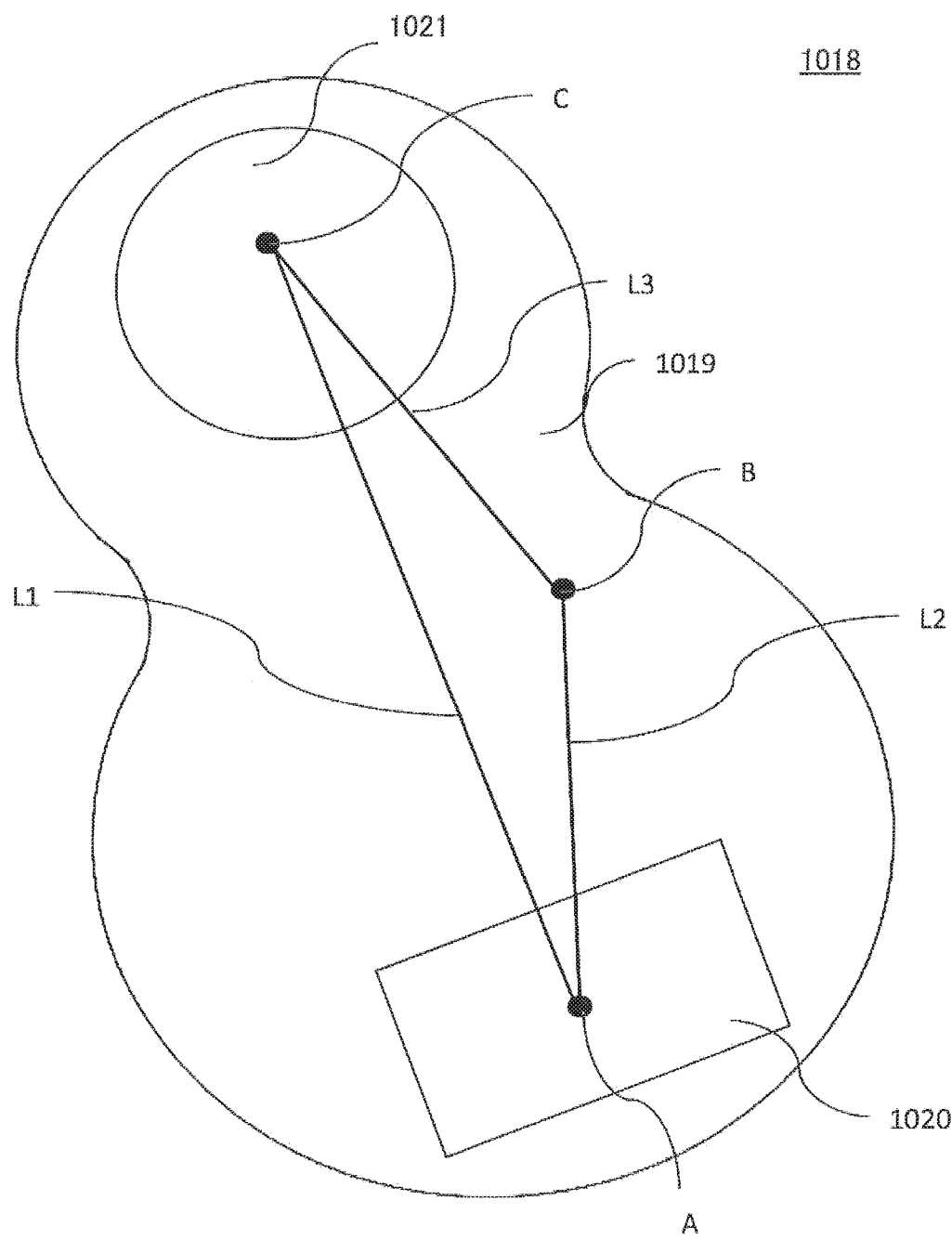
FIG. 12 illustrates the concept of computing the distance traveled by a struck golf ball and the distance that remains for the golf ball to travel to the target coordinates up to the green.

The following description is now presented by using FIG. 12. The point A on the tee ground 1020 provided on the fairway 1019 and from which a golf ball 1018 is struck onto the fairway 1019 is designated as the point where each of the golf players 200b, 200c and so on provides the tee shot. The point B on the fairway 1019 is designated as the point where the golf ball struck by each of the golf players 200bm 200c and so on falls on the ground. The point C is designated as the point which corresponds to the target coordinates up to the green and where the player terminal 300a is located in which the location of the player terminal 300a corresponds to the position in the above target coordinates name as measured by the golf player 200a.

At the points A and B, the current position information for each of the player terminals 300b, 300c and so owned by the respective golf players 200b, 200c and so on is measured by the position information acquiring function 307.

The remaining distance computing function 310 is enabled to acquire the position information for the player terminal 300a located at the point C on the green, that is, the target coordinates measured information, from the player's course data table 304g.

The remaining distance computing function 310 is then enabled to use the coordinates concerned with the position information at the point A or point B or the coordinates concerned with the target coordinates measured information at the point C from which the function 310 computes the distance L1 between the point A and the point C or the distance L3 between the point B and the point C as the distance that remains for the golf ball of each of the golf players 200b, 200c and so on to travel from its current position to the target coordinates up to the green (S118).

The distance L1 or L3 thus computed as the remaining distance will be presented on each of the remaining distance display sections 1017b to 1017d. The subsequent operations are repeated by following the steps S116 and S118.

It may be appreciated from the above description that in the prior art, the golf player 200 was supplied with the information concerning the carry distance and the remaining distance up to the green by using the course data including the target coordinates up to the green as set by the service supplier. It may also be appreciated, however, that the present invention allows the golf player 200 himself or herself to set the target coordinates up to the green, thus providing more chances to select the course data including the target coordinates up to the green.

In addition, the present invention allows the other golf players 200b, 200c and so on to use the target coordinates measured information provided by one particular golf player 200a, thus allowing some familiar or friendly golf players within a particular group to share the target coordinates measured information provided by one particular golf player and thus offering more chances to enjoy the golf play.

From the standpoint of the service supplier, furthermore, the present invention offers the following benefits to the service supplier. For the golf courses in the golf play facilities overseas, for example, the service supplier can save the step of causing the service supplier to set the target coordinates up to the green by permitting the golf player 200 to set the same. The service supplier can only enter the minimum required information such as the golf play facilities name, the course name, the number of holes, the hole number, the number of pars up to the hole and the like. Thus, the cost required in setting the target coordinates up to the green on each of the golf courses can be reduced.

While the remaining distance is computed, the golf ball's carry distance for each of the other golf players 200b, 200c and so on will also be computed at the same time. The golf ball's carry distance will be computed by the carry distance computing function 309.

After the position information for each of the player terminals 300b, 300c and so on at the points A and B in FIG. 12 has been measured by the position information acquiring function 307, the carry distance computing function 309 will be enabled to use the coordinates concerned with the position information at the points A and B from which this function 309 computes the distance L2 between the points A and B as the golf ball's carry distance for each of the golf players 200b, 200c and so on (S117).

The distance L2 thus computed as the carry distance will appear on the carry distance display section 1017e as shown in FIG. 11 (a). The subsequent steps will be repeated by following the steps S116 and S117.

Next, each of the golf players 200b, 200c and so on may utilize the target coordinates measured information as measured by the one particular golf player 200a from which the golf players 200b, 200c and so on can estimate the target coordinates measured information while the players are play the golf or after the players finished play the golf.

When the application program 405 that has been downloaded onto each of the player terminals 300b, 300c and so on is started, the menu select screen 1000 shown in FIG. 5, the course data create/estimate select screen 1001 or the remaining distance/carry distance measuring screen 1017 shown in FIG. 11 (*a*) will appear on the display unit 306.

On the menu screen 1000 in FIG. 5, the non-estimated course data call section 1000*b* may be selected. When the non-estimated course data call section 1000*b* is selected, the golf play facilities list screen 1005 shown in FIG. 13 (*a*) will appear on the display unit 306.

On the course data create/estimate selecting screen 1001 in FIG. 6, the course data estimate indicating section 1001*b* may be selected. When the course data estimate indicating section 1001*b* is selected, the golf play facilities list screen 1005 shown in FIG. 13 (*a*) will appear on the display unit 306.

The golf players 200*b*, 200*c* and so on will select the appropriate golf play facilities data 1005*a* in which the golf players may utilize the target coordinates measured information in order to estimate that information.

Figure 13C:
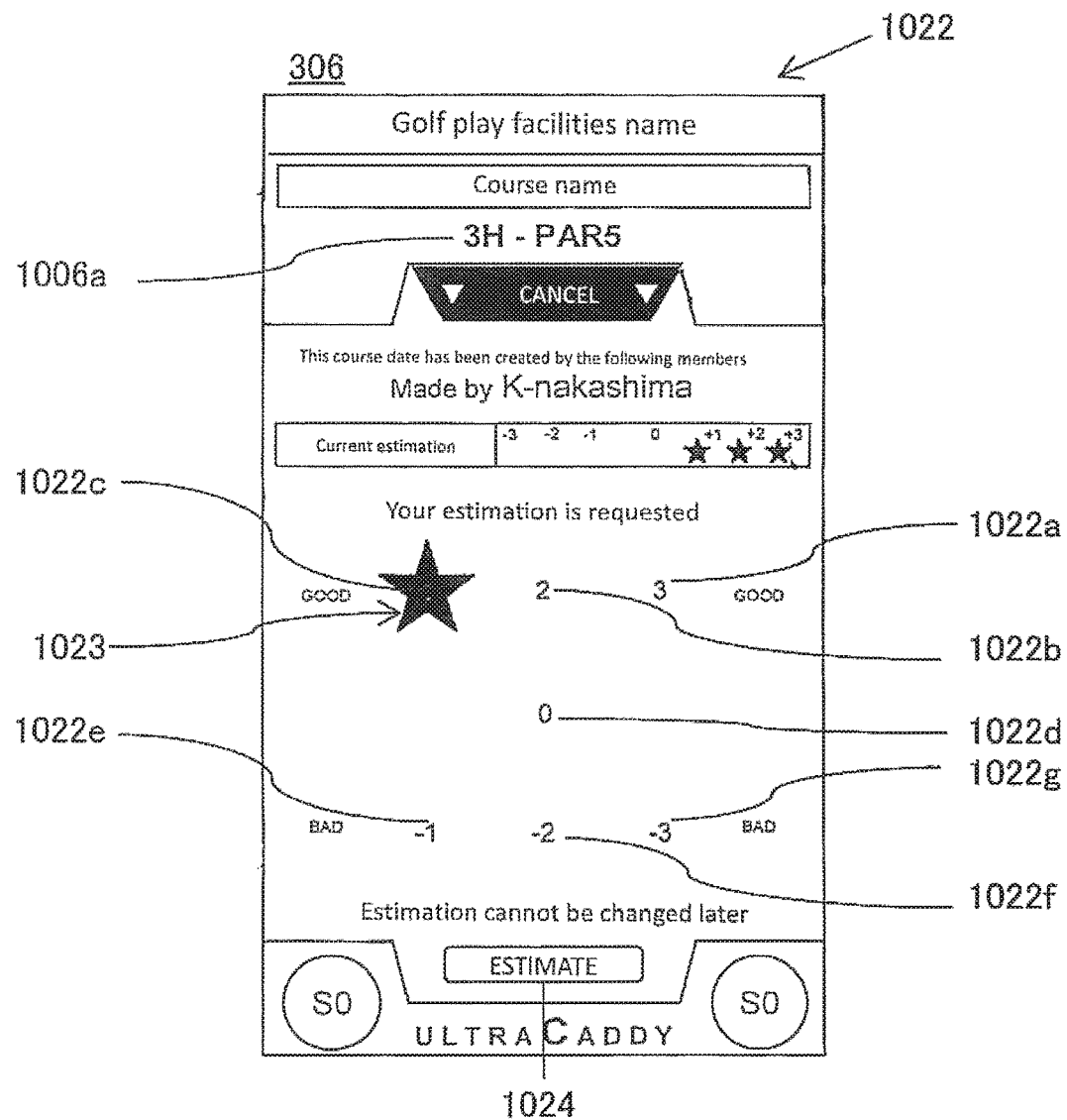

Following this selection, the hole list screen 1006 shown in FIG. 13 (*b*) will appear on which the golf players may select the appropriate hole data 1006*a* concerned with the above target coordinates measured information.

When the appropriate hole data 1006*a* is selected, the course data estimation entering screen 1022 on which the golf players are asked to estimate the target coordinates measured information shown in FIG. 13 (*c*) will appear on the display unit 306. On the course data estimation entering screen 1022, the estimation points 1022*a* to 1022 *g* have been provided.

When the course data estimation indicating section 1017*f* that is provided on the remaining distance/carry distance measuring screen 1022 shown in FIG. 11 (*a*) is selected, the above course data estimation entering screen 1022 will appear on the display unit 306, asking the players to estimate the above target coordinates measured information as shown in FIG. 13 (*c*).

The golf players 200*b*, 200*c* and so may select one estimation point among the estimation points 1022*a* to 1022*g*, causing the estimation icon 1023 to appear as shown. When the estimation point registering section 1024 is then selected, the estimation point thus selected will be confirmed (S119). The estimation point thus confirmed will be transmitted to the server device 400 (S120).

When the server device 400 has received the confirmed estimation point, the estimated information gathering function 412 will be enabled to gather the confirmed estimation point (S121). The estimation point thus gathered will be entered into the player's course data table 404*g* as the gathered estimation point (S122).

The gathered estimation point thus entered will appear as the collection of the estimation icons 1023 on the hole list screen 1006 used to select the hole data shown in FIG. 7 (*b*), on the target coordinates setting screen 1007 used to select the target coordinates up to the green shown in FIG. 8 (*a*) and on the course data estimation entering screen 1022 used to select the estimation point shown in FIG. 13 (*c*), respectively.

On the display unit 306 in the player terminal 300 for the golf player 200 on which the golf player 200 has once utilized the target coordinates measured information as described above, the estimation icon 1023 will appear as shown, and the reliable estimation of the target coordinates up to the green on the golf course is ready to be shared with the golf players 200.

Then, the golf player 200 will be able to utilize the target coordinates up to the green on the golf course by using the estimation icon as the useful reference. Therefore, the golf courses that have been estimated well as described above will provide more chances for the golf player 200 to utilize such golf courses.

Second Embodiment

By referring to FIGS. 14 through 20, the following description provides the embodiment in which the information sharing system 100 of the present invention is used to enable the golf player 200 and the viewer 500 to share the golf scorecard provided by the golf player 200.

Figure 14:
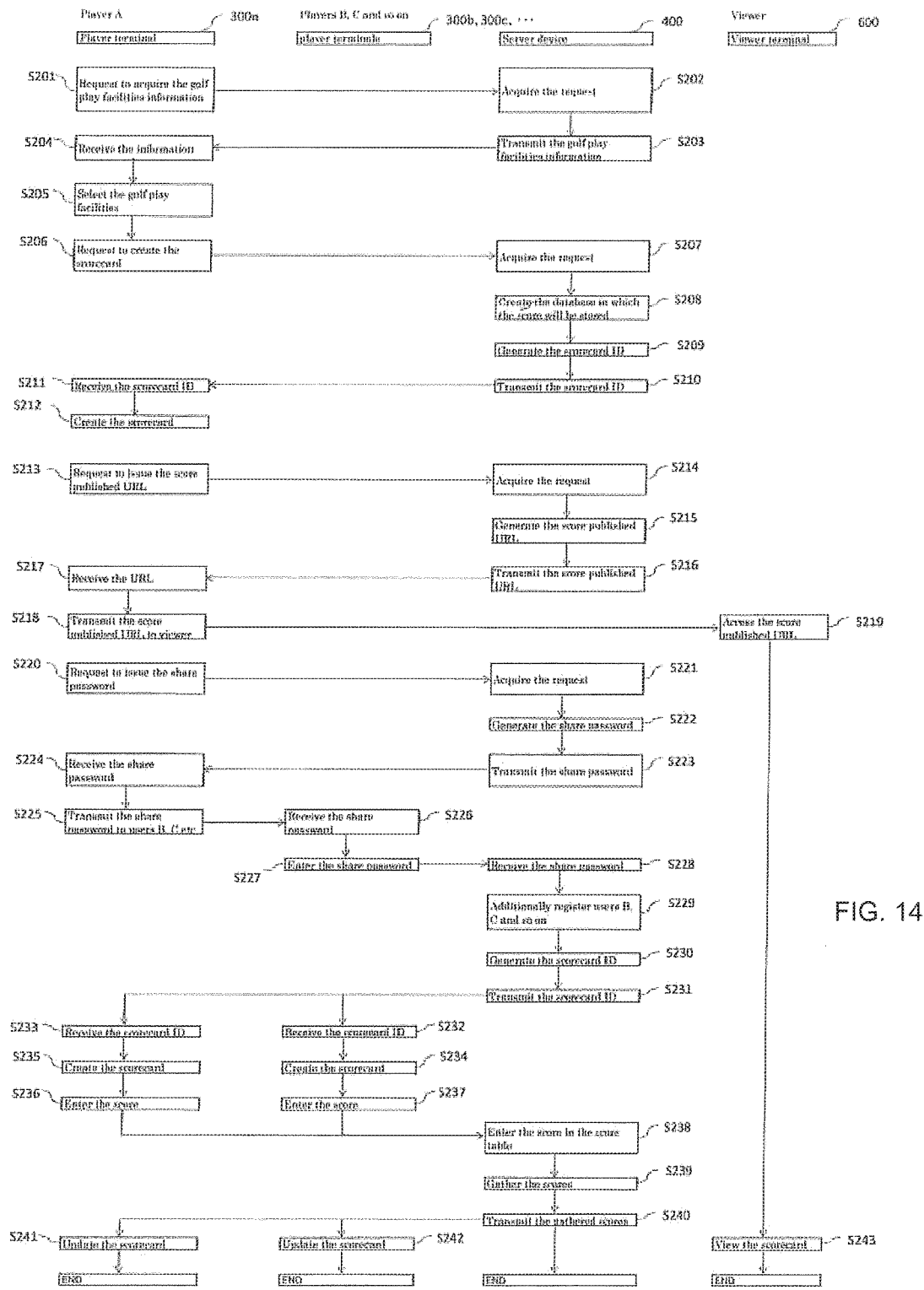
FIG. 14 represents a flowchart diagram of the steps which are followed by the information sharing system in accordance with one embodiment of the present invention in which the information sharing system is used to share the golf scorecard presented by several golf players among those golf players and several viewers who are interested in viewing those golf scorecards.

FIG. 14 is a flowchart diagram illustrating the steps that are followed by the system of the present invention to permit the golf scorecard provided by the golf player 200 to be shared by the golf player 200 and the viewer 500.

The golf player 200 accesses the server device 400 by using the player terminal 300, and requests the server device 400 to download the application program 405 running on the system of the present invention onto the player terminal 300.

In response to the receipt of this request, the server device 400 will transmit the application program 405 onto the player terminal 300.

The player terminal 300 having the application program 405 thus downloaded will start up the application program 405.

When the application program 405 is started up, the menu select screen 1000 shown in FIG. 5 will appear on the display unit 306.

On the menu select screen 1000, the golf player 200 may select the round setting indicating section 1000*c*. When the round setting indicating section 1000*c* is selected, the round selecting screen 2000 shown in FIG. 15 will appear on the display unit 306, asking the golf player 200 to select the appropriate round.

Among the golf player 200, the particular golf player 200*a* who acts as the host or manager of the golf competition, for example, will select the new-round selecting section 2000*a* on the round selecting screen 2000 by using the player terminal 300*a*.

Figure 15:
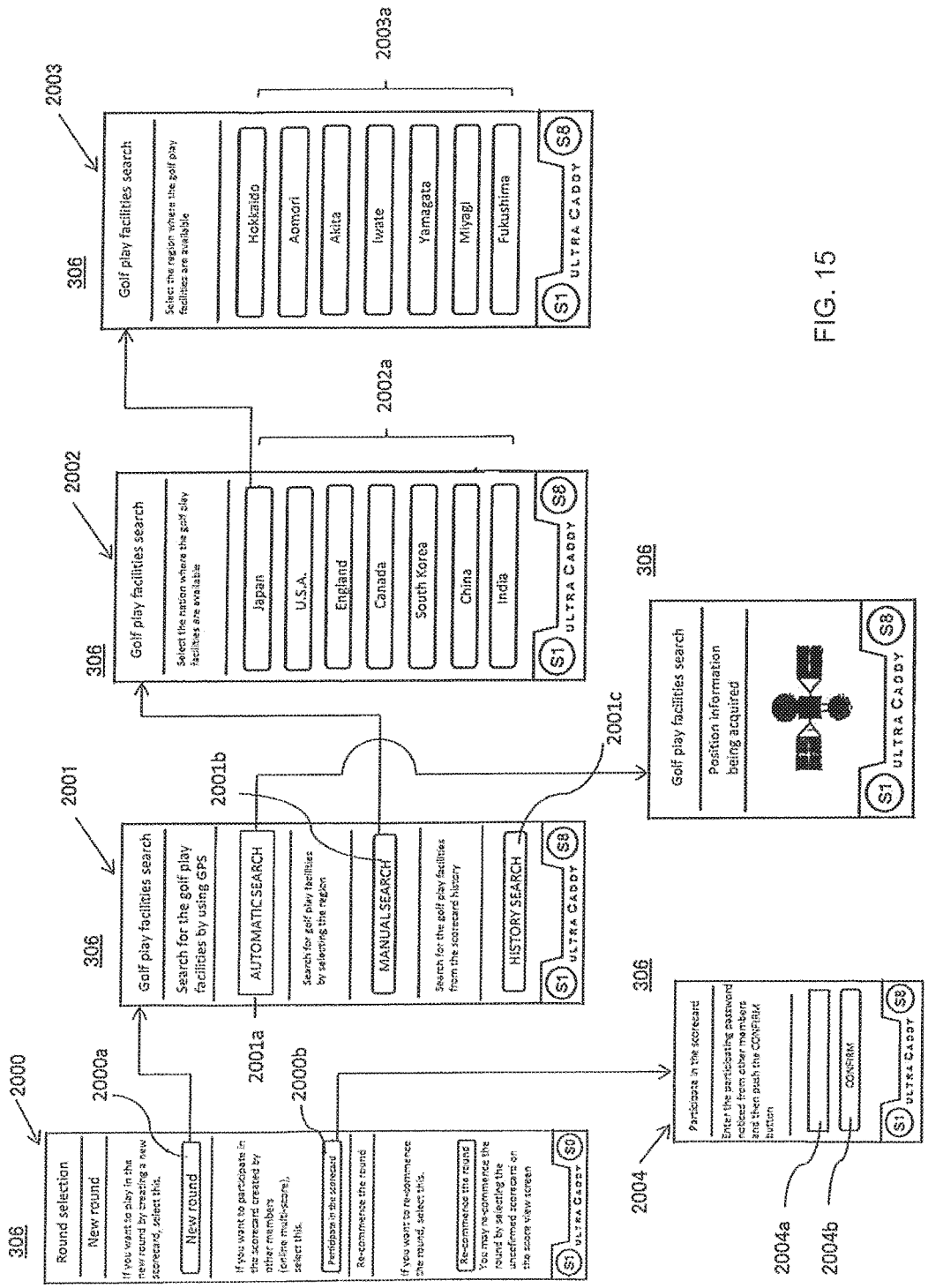
FIG. 15 illustrates one example of the sequence of the steps that are followed to allow one particular golf player to select, on the menu screen shown in FIG. 5, the appropriate golf play facilities that can be used to set the round in the golf course.

When the new-round selecting section 2000*a* is selected, the golf play facilities searching screen 2001 will appear on the display unit 306, asking the golf player 200*a* to search for the appropriate golf play facilities that are available as shown in FIG. 15.

Then, the golf player 200*a* may select any one of the automatic search indicating section 2001*a*, the manual search indicating section 2001*b* and the history search indicating section 2001*c* all of which appear on the golf play facilities screen 2001.

If the automatic search indicating section 2001*a* is selected, the position information acquiring function 307 will be enabled to acquire the position information for the player terminal 200*a* by exchanging the satellite communications with the GPS satellite 900. In this step, the position information acquiring function executing screen shown in FIG. 15 will appear on the display unit 306. The position information thus acquired will be transmitted to the server device 400 together with the golf play facilities search indicating information that is provided by selecting the automatic search indicating section 2001*a* (S201 in FIG. 14).

The golf play facilities selecting function 406 in the server device 400 will be enabled to acquire the above search indicating information as well as the position information (S202), and select the data items for the appropriate golf play facilities located nearest to the above current position information (ten data items, for example) from each respective one of the golf play facilities name table 404a, the course name table 404b, the number of holes table 404c and the hole number table 404d all of which are contained in the golf play facilities database 404, and transmit the data items for the golf play facilities thus selected to the player terminal 300a (S203).

Figure 16A:
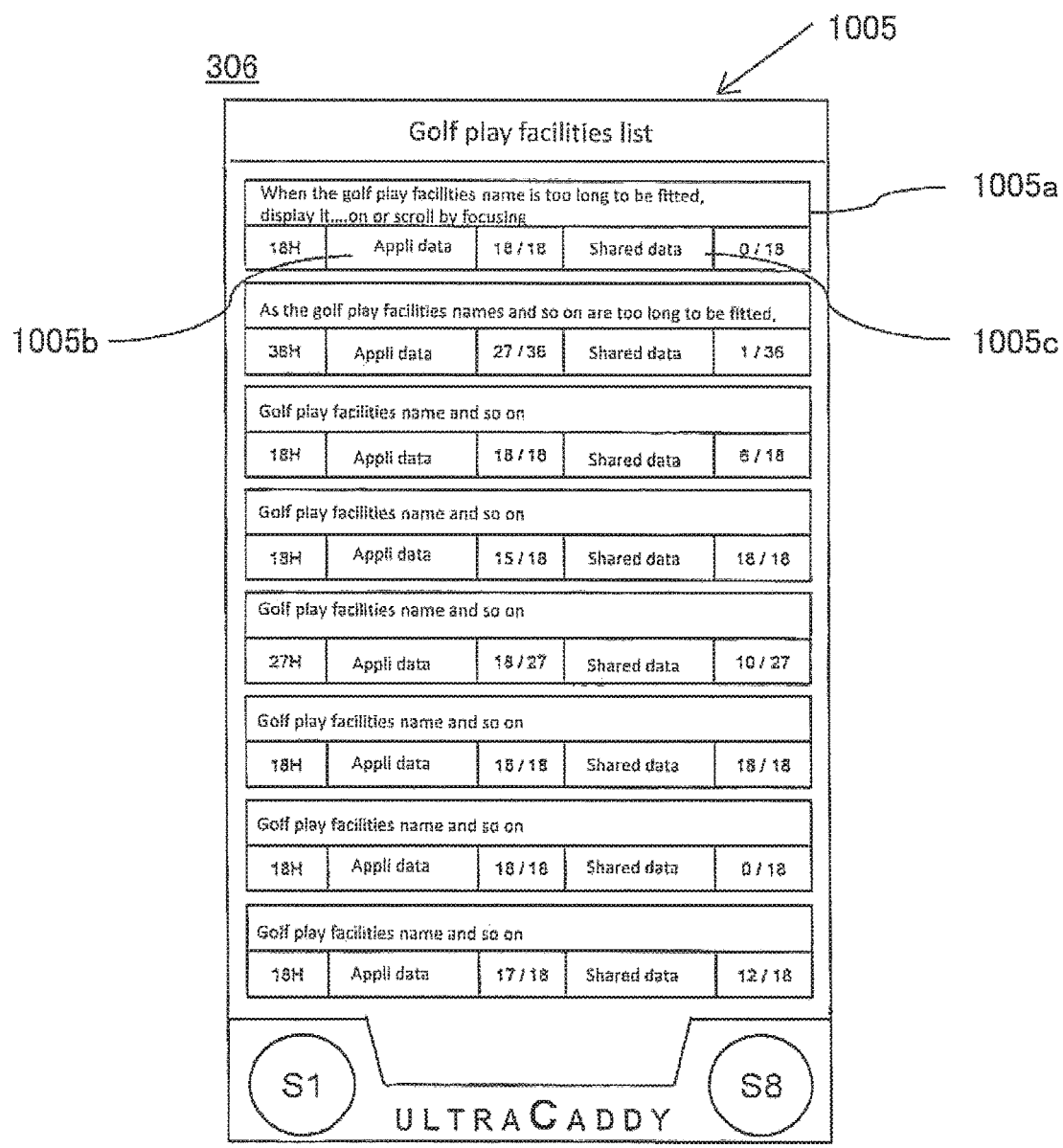
FIG. 16A and FIG. 16B represent the sequence of the steps to be continued in selecting the golf play facilities as shown in FIG. 15A, in which illustrates one example of the golf play facilities list
Figure 16B:
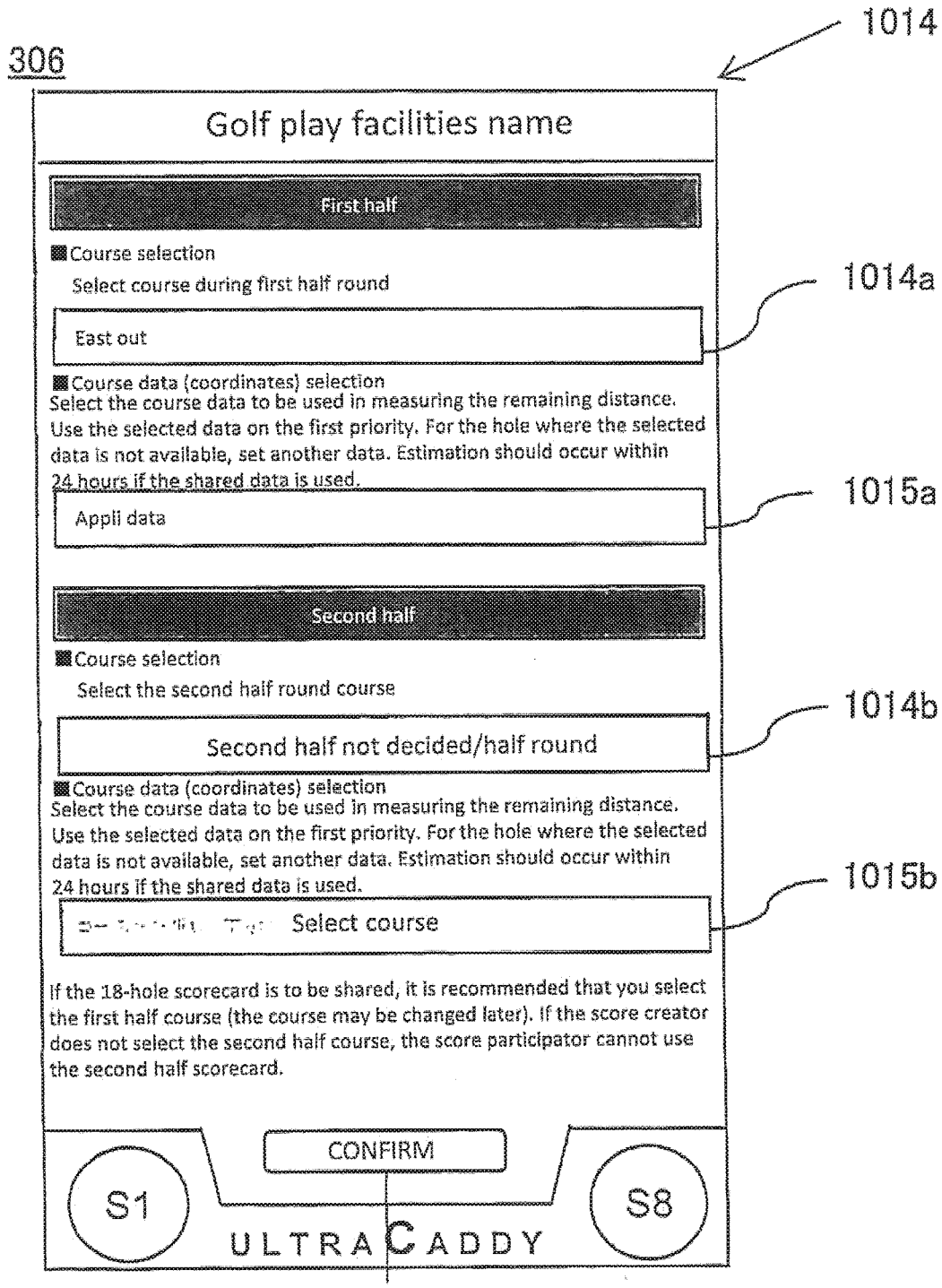

The golf play facilities list screen 1005 shown in FIG. 16 (a) will then appear on the display device 306 in the player terminal 300a (S204).

If the manual search indicating section 2001b is selected, the nation name selecting screen 2002 shown in FIG. 15 will appear on the display unit 306, asking the golf player 200a to select the appropriate nation name.

The golf player 200a may select the nation name 2002a in which the golf player 200a wants to search for the appropriate golf play facilities from a plurality of nation names 2002a appearing on the nation name selecting screen 2002. In this embodiment, "Japan" has been selected as the nation name 2002a.

When the nation name 2002a is selected, the region name selecting screen 2003 shown in FIG. 15 will appear, asking the golf player 200a to select the appropriate region name.

In response to the receipt of the above request, the golf player 200a may select the appropriate region name 2003a where the golf player 200a wants to further search for the appropriate golf play facilities from a plurality of region names 2003a appearing on the region name selecting screen 2003. In this embodiment, "Hokkaido has been selected as the region name 2003a.

When the region name 2003a is selected, the search condition information for the nation name selected above and the region name thus selected will be transmitted to the server device 400 together with the golf play facilities search indicating information which is provided by selecting the manual search indicating section 2001b (S201).

The golf play facilities selecting function 406 in the server device 400 will be enabled to acquire the search condition information as well as the indication information provided above (S202), select the appropriate golf play facilities data (ten data items, for example) that meets the above search condition information from each respective one of the golf play facilities name table 404a, the course name table 404b, the number of holes table 404c and the hole number table 404d all of which are contained in the golf play facilities database 404, and transmit the golf play facilities data thus selected to the player terminal 300a (S203)

The golf play facilities list screen 2005 shown in FIG. 16 (a) will then appear on the display unit 306 in the player terminal 306 (S204).

If the history search indication section 2001c is selected, the golf play facilities search indicating information which is provided by selecting the history search indicating section 2001c will be transmitted to the server device 400 (S201).

The golf play facilities selecting function 406 in the server device 400 will then be enabled to select the data for the golf play facilities (ten data items, for example) that the golf player 200a has used in the past by referencing the golf score in the golf play facilities selected above that has been entered into the score table 404h, and transmit the data for the golf play facilities thus selected to the player terminal 300a (S203).

The golf play facilities list screen 1005 shown in FIG. 16 (a) will then appear on the display unit 306 in the player terminal 300a (S204).

The golf play facilities data 1005a in the golf play facilities list screen 1005 shown in FIG. 16 (a) provides the entries for the golf play facilities names, the course names, the number of holes, the hole number, the number of pars up to the hole which are entered into each respective one of the respective tables in the golf play facilities database 404. It has been described that the two types of the golf play facilities data 1005a are available. One type is the golf play facilities data 1005b entered by the service supplier and the other type is the golf play facilities data 1005c entered by the golf player 200.

The service supplier's golf play facilities data contains the data for the golf play facilities entered by the service supplier, such as the golf play facilities names, course names, the number of holes, the hole number, the number of pars up to the hole as well as the course data entered by the service supplier, such as the target coordinates required in computing the distance that remains for the golf ball to travel from its current position to the green.

The player's golf play facilities data 1005e contains the data items for the golf play facilities entered by the above service player, such as the golf play facilities names, course names, the number of holes, the hole number, the number of pars up to the hole as well as the course data entered by the golf player 200, such as the target coordinates required in computing the distance that remains for the golf ball to travel from its current position to the green and the estimation information that is provided by several golf players 200b, 200c and so on in respect of the target coordinates entered by the service supplier and the golf player 200. [0184] The golf player 200a will select the data items 1005a for the appropriate golf play facilities 1005a that the golf player 200 wants to use from the plurality of golf play facilities that appear on the golf play facilities screen 1005 (S205).

When the appropriate golf play facilities data items 1005a are selected, the round condition selecting screen 1014 will appear on the display unit 306, asking the golf player 200 to enter the round condition for the golf course as shown in FIG. 16 (b).

The round condition selecting screen 1014 provides the first round selecting section 1014a for selecting the round condition in the first half of the golf course and the second round condition selecting section 1014b for selecting the round condition in the second half of the golf course.

The first round condition selecting section 1014a and the second round condition selecting section 1014b provide the options that may be chosen to select the out-course or in-course, for example.

In addition, the round condition selecting screen 1014 provides the first course data selecting section 1015a for selecting the course data including the target coordinates up to the green that may be utilized during the first half of the golf course and the second course data selecting section 1015b for selecting the course data including the target coordinates up to the green that may be utilized during the second half of the golf course On the first course data selecting section 1015a and the second course data selecting section 1015b, the golf play facilities data 1005b provided by the service supplier or the golf play facilities data 1005c provided by the golf player may be selected.

When the selection is made on the first round selecting section 1014a and the second round selecting section 1014b as well as the first course data selection section 1015a and the second course data selecting section 1015b, the information registering section 1016 may be selected. The information entering steps are thus completed.

If the golf plying facilities data 1005b provided by the service supplier when the selection is made on the first course data selecting section 1015*a* and the second course data selecting section 1015*b*, the target coordinates up to the green and the target coordinates measured information will be provided and transmitted from the service supplier's course data table 404*f* on the server device 400. If the golf play facilities data 1005*c* provided by the golf player, the target coordinates up to the green and the target coordinates measured information will be provided and transmitted from the player's course data table 404*g* on the server device 400. Then, the golf player 200 may utilize the target coordinates up to the green and the target coordinates measured information provided by the service supplier or by the golf player 200.

The round condition and the target coordinates thus selected will be entered into the score table 304*h* on the player terminal 300*a*, and may be utilized during the steps of creating a scorecard to be described later.

After the information registering section 1016 has been selected, the scorecard creation selecting screen 2005 will appear, asking the golf player 200 to create a scorecard shown in FIG. 17 (*a*).

The scorecard creation selecting screen 2005 provides the non-shared scorecard creation selecting section 2005*a* on which the scorecard that will not permit the golf score of the golf player 200 to be shared among the golf players or published to the viewer 500 may be created and the shared scorecard creation selecting section 2005*b* on which the scorecard that will permit the golf score of the golf player 200 to be shared among the golf players or published to the viewer 500 may be created.

Even if the golf player 200*a* has selected either of the non-shared scorecard creation selecting section 2005*a* and the shared scorecard creation selecting section 2005*b* (S206), the indicating information thus selected will be transmitted from the player terminal 300*a* to the server device 400 (S207), and the scorecard table 404*h* will be created by the scorecard ID generating function 407 so that the scorecard of the golf player 200*a* can be stored in the golf play facilities database 404 (S208).

The scorecard ID generating function 407 will be enabled to generate a scorecard ID that permits the player terminal 300*a* for the golf player 200*a* to create the golf scorecard of the golf player 200*a* (S209).

The scorecard ID generating function 407 will then be enabled to generate the master ID described previously and the slave ID formed by the cord that identifies the player terminal 300*a* that wanted to create the scorecard. The scorecard ID that includes the combination of the master ID and the slave ID will be generated.

The scorecard ID thus generated will be entered into each of the tables in the golf play facilities database 404 after it has been associated with the data in those tables.

The scorecard ID thus generated will also be transmitted to the player terminal 300*a* (S210), and will be entered into each of the tables in the golf play facilities database 304 on the player terminal 300*a* after it has been associated with the data in those tables.

In response to the scorecard ID thus received (S211), the scorecard creating function 308 on the player terminal 300*a* will then be enabled to create a golf scorecard 2011 of the golf player 200*a* in the specific format shown in FIG. 18 (*b*), for example (S212).

After the golf scorecard of the golf player 200*a* has been created, the scorecard create completion noticing screen 2009 shown in FIG. 17 (*e*) will appear on the display unit 306. The notice confirming section 2009*a* will then be selected, and the golf scorecard create indicating steps are thereby finished.

In FIG. 17 (*a*), if the shared scorecard creation selecting section 2005*b* is selected, the scorecard ID will have been generated by passing through the steps S206 to S211 and the share password/scorecard published terminal information issue selecting screen 2006 shown in FIG. 17 (*b*) will appear on the display unit 306, asking the golf player 200*a* to issue the score published terminal information that is required for permitting the viewer 500 to view the share password required to allow the scorecard to be shared by the other golf players 200*b*, 200*c* and so on.

On the share password/score published terminal information issue selecting screen 2006, the share password issue indicating section 2006*a* for indicating the share password issue and the score published terminal information issue indicating section 2006*b* for indicating the score published terminal information issue will appear.

If the score published terminal information issue indicating section 1006*b* is selected (S213), this indicating information will be transmitted from the player terminal 300*a* to the server device 400 (S214). In response to the receipt of this indicating information, the score published terminal information generating function 410 will then be enabled to generate a published URL 2007*a* that is written in the HTML format data, for example (S215). The published URL 2007*a* thus generated will be transmitted back to the player terminal 300*a* (S216).

On the player terminal 300*a* that received the published URL 2007*a* S217), the message transmit program installed on the player terminal 300*a* such as the electronic mail will be executed so that the URL publishing notice including the published URL 2007*c* can be transmitted from the player terminal 300*a* to the viewer terminal 600 (S218).

On display unit 605 on the viewer terminal 600, the score published terminal information notice screen 2007 shown in FIG. 17 (*c*) will appear. The published URL 2007*a* will then appear on the score published terminal information noticing screen 2007. When the viewer 500 selects the published URL 2007*a* by using the input unit 604, it will permit the viewer 500 to view the confirmed share scorecard 2012 shown in FIG. 18 (*c*) (S243).

If the share password issue indicating section 2006*a* is selected (S220), the indicating information thus selected will be transmitted from the player terminal 300*a* to the serve device 400 (S221), and the share password generating function 408 will then be enabled to generate a share password 2008*a* that is required for permitting the player terminals 300*b*, 300*c* and so on to share the golf scorecard created by the share password creating function 308 (S222). The share password 2008*a* is associated with the master ID included in the scorecard ID generated by the scorecard ID generating function 407.

The share password 2008*a* thus generated will be entered into the score table 204*h* after it has been associated with the scorecard ID.

The share password 2008*a* will then be transmitted to the player terminal 300*a* (S223). On the player terminal 300*a* that received the share password (S224), the message transmit program installed on the player terminal 300*a* such as the electronic mail will be executed so that the shard password issue notice can be transmitted from the player terminal 300*a* to the other player terminals 300*b*, 300*c* and so on (S225).

On the player terminal 300*a* from which the URL published notice and the share password issue notice have been transmitted to the viewer terminals 600a, 600c and so on and the other player terminals 300b, 300c and so on, the issue completion selecting section 2006c is selected. The steps for issuing the score published terminal information and the share password will be finished.

On the other player terminals 300b, 300c and so on that received the share password issue notice (S226), the round setting indicating section 1000c will be selected from the menu screen 1000. This will cause the round selecting screen 2000 to appear on the display unit 306, asking the other golf players to select the round shown in FIG. 15.

Each of the other golf players 200b, 200c and so who play the golf together with the one particular gold player 200a will be asked to select the round participation select section 2000b in order to participate in the same round as the new round selected by the one particular golf player 200a.

When the round participation selecting section 2000b is selected, the share password 2008a authenticating screen 2004 shown in FIG. 15 will appear on the display unit 306 on which the golf players 200b, 200c and so on will be able to participate in the round.

The golf players 200b, 200c and so on will enter the share password thus acquired by the player terminals 300b, 300c and so on the share password entering section 2004a, and will select the authenticate indicating section 2004b (S227).

When the authenticate indicating section 2004b is selected, the share password 2008a thus entered on the entering section 2004a will be transmitted from the player terminals 300b, 300c and so on to the server device 400 (S228), and the share password authenticating function 409 will then be enabled to match the same master ID as the master ID associated with the share password 2008a against the master ID's associated with the scorecard ID entered in each of the tables contained in the golf play facilities database 404 and then select the same master ID thus matched.

If the same master ID has been selected, the scorecard ID generating function 407 will then be enabled to generate a slave ID formed by the code that identifies each of the player terminals 300b 300c and so on for each of the golf players 200b, 200c and so on who utilize the golf scorecard, and generate a scorecard ID including the combination of the thus generated slave ID and the selected master ID (S230).

This scorecard ID includes the two master ID's shown in FIG. 2 (b) as one example that are attached to the slave ID for identifying the player terminal 300a and the slave ID for identifying each of the other player terminals 300, respectively (S229).

The scorecard ID thus generated will be entered into each of the tables in the golf play facilities database 404 after it has been associated with the data in those tables.

The scorecard ID will also be transmitted to the player terminals 300a, 300b, 300c and so on (S231), and will be entered into each of the tables in the golf play facilities database 404 for the player terminals 300a, 300c and so on after it has been associated with the data in those tables.

After the share password 2006a was authenticated, the round condition selecting screen 1014 shown in FIG. 10 (b) will appear on the display unit 306 in each of the player terminals 300b, 300c and so on, asking the golf players to enter the round condition.

This second embodiment differs from the first embodiment described above in that the first round selecting section 1014a and the second round selecting section 1014b as well as the first course data selecting section 1015a and the second course data selecting section 1015b are provided to present the round condition and the course data that may be selected by the player terminal 300a which are utilized by the other golf players 200b, 200c and so on.

After the information registering section 1016 has been selected, the data items such as the course name, the number of holes, the hole number, the number of pars and the like that have been entered in each respective one of the tables in the golf play facilities database 404 on the server device 404 and which correspond to the round condition and the course data will be transmitted to the player terminals 300b, 300c and so on.

Figure 19A:
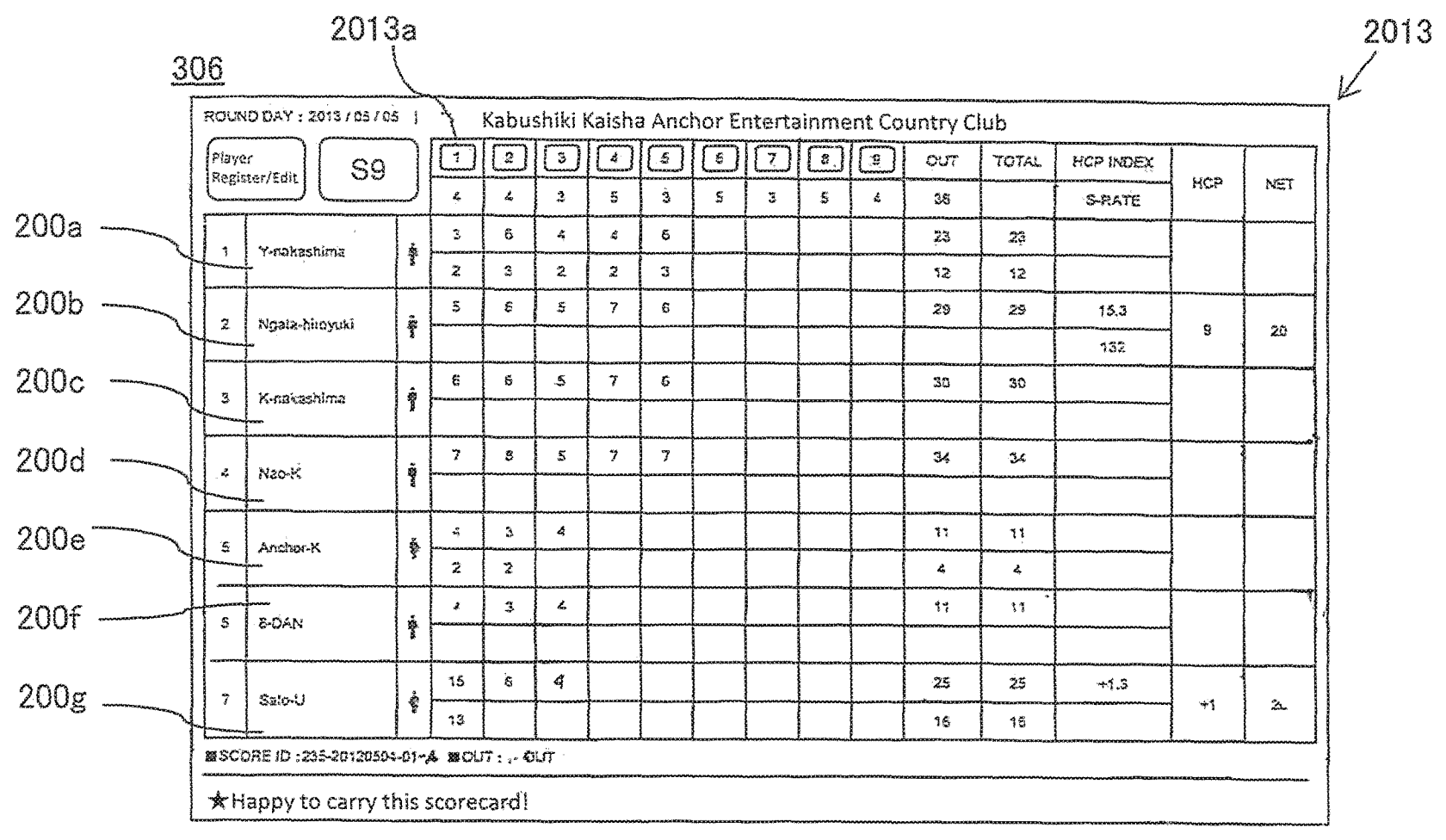
Figure 19B:
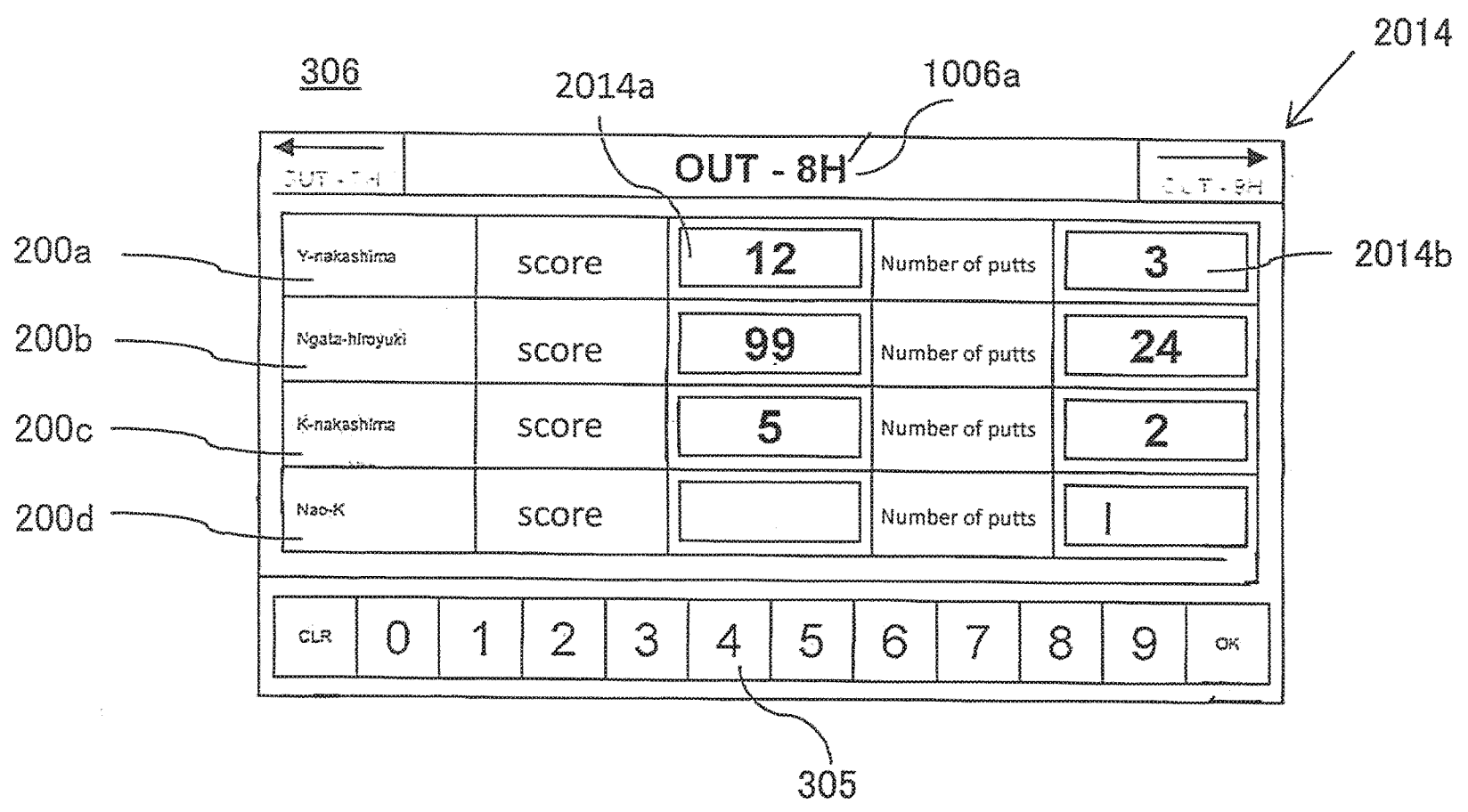

When the scorecard creating function 308 on each of the player terminals 300a, 300b, 300c and so on has received the scorecard ID (S232, S233), it will be enabled to create an unconfirmed share scorecard 2013 for the golf player 200 having the specific format shown in FIG. 19 (a), for example (S234, S235).

The unconfirmed share scorecard 2013 includes the golf scorecard for the golf player 200a who has selected the new round and the golf scorecard for each of the other golf players 200b, 200c and so on who has participated in the round. In addition, it includes the information related to the golf course such as the number of holes, the hole number, the number of pars, the round condition, the course data and the like.

After the unconfirmed share scorecard 2013 has been created, the scorecard creation completion noticing screen 2009 shown in FIG. 17 (e) will appear. Then, the notice confirming section 2009a will be selected, and the scorecard creating steps are thereby finished.

The golf players 200a, 200b, 200c and so on who have received the unconfirmed share scorecard 2013 will be asked to select the unconfirmed score call section 1000a on the menu screen 1000 shown in FIG. 5, causing the scorecard list screen 2010 shown in FIG. 18 (a) to appear on the display unit 306.

On the scorecard list screen 2010, the unconfirmed scorecard 2010a in which the golf score has not yet been entered and the confirmed scorecard 2010b in which all golf scores for the golf player 200 have been entered have appeared. If the unconfirmed scorecard 2010a is selected, the unconfirmed share scorecard 2013 shown in FIG. 19 (a) will appear on the display unit 306. If the confirmed scorecard 2010b is selected, the confirmed share scorecard 2012 shown in FIG. 18 (c) will appear on the display unit 306.

If the golf player 200 enters the scorecard for each hole while the unconfirmed share scorecard 2013 is being displayed, the golf player 200 may select the hole number 2013a.

After the hole number 2013a has been selected, the score entering screen 2014 shown in FIG. 19 (b) will appear on the display unit 306. On the score entering screen 2014, the golf player 200 may use the input unit such as the touch keys or the like to enter the score such as the number of strokes, the number of putts and the like on the score entering section 2014a and the number of putts entering section 2014b, respectively (S236, S237).

The golf scores thus entered will be transmitted from the golf player 300 to the server device 400, on which the golf scores will be entered into the score table 404h (S238).

The score gathering function 411 will then be enabled to gather the golf scores for the golf player 200 as entered in the score table 404h S239 and transmit the scores thus gathered to the player terminal 300 (S240).

The scorecard creating function 308 on the player terminal 300 will be enabled to update the unconfirmed scorecard 2013 in response to the receipt of the gathered scores (S241, S242). The unconfirmed share scorecard 1013 thus updated will appear on the display unit 306 on the player terminal 300.

The score published terminal information generating function 410 will also be enabled to update the relevant data items related to the golf scores that has been written in the HTML format data for the published URL 2007a.

The score viewer 600 may also view the confirmed scorecard 2012 thus updated when accessing the published URL 2007a during the step S219 (S243).

It should be noted that when the golf scores thus entered are gathered, the score gathering function 411 may also gather those golf scores by arranging them in the sequence in which the best golf scores are gathered first.

It may be understood from the foregoing description that the golf scores for each of the golf players are presented on the confirmed share scorecard 2012 and the unconfirmed share scorecard 2013 so that the confirmed share scorecard 2012 and the unconfirmed share scorecard 2013 can be shared among those golf players 200. For this reason, the golf players 200 can immediately know the order and/or golf scores of each of the golf player. Thus, the golf players 200 can share the pleasure of enjoying the golf among them.

The confirmed share scorecard 2012 can be converted into the HTML format data as the published URL 2007a. Then, the viewer 500 who actually does not take part in the golf competition may also view the confirmed share scorecard 2012 by accessing the published URL 2007a. Thus, the viewer 500 can have the chance of sharing the pleasure of play the gold with the golf player 200.

Figure 20:
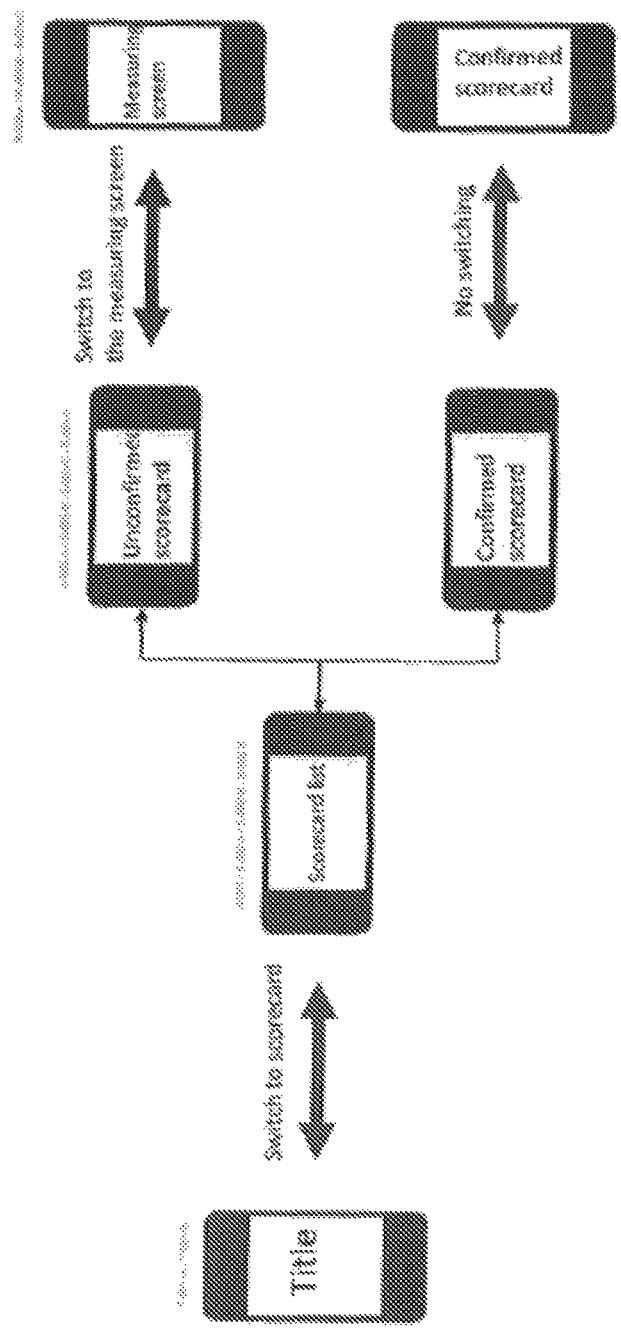
FIG. 20 illustrates the concept of switching between the different function indications depending on the tilts of the screen on the player terminal.

In the first and second embodiments described so far, it should be noted that the display unit 306 on the player terminal 300 such as the smartphone or tablet terminal as shown in FIG. 20 may present the menu screen 1000 that may be tilted vertically and the scorecard list screen 2010 that may be tilted horizontally or the display unit 306 may present the unconfirmed share scorecard 2013 that may be tiled horizontally and the current position information measuring screen 1013 that may be tilted vertically. In either case, those tilts can be switched.

The acceleration sensor 312 that is provided on the player terminal 300 is capable of detecting any tilt along the X axis, Y axis and Z axis of the player terminal 300, for example, when the menu screen 1000 tilted vertically is presented by the display unit 306. For example, if it is assumed that the player terminal 300 is tilted horizontally and its right side is tilted toward the top or bottom as previously determined, the tilts of the player terminal 300 along the X axis, Y axis and Z axis as detected by the acceleration sensor 312 will be provided as the output which is transmitted to the function display switching function 311

In response to the receipt of the tilts provided as the output, the display switching function 311 will be enabled to switch from the vertically tilted menu screen 1000 to the horizontally tilted scorecard list screen 2010.

The acceleration sensor 312 that is provided on the player terminal 300 is capable of detecting any tilt along the X axis, Y axis and Z axis of the player terminal 300, for example, when the scorecard list screen 2010 tilted horizontally is presented by the display unit 306. For example, if it is assumed that the player terminal 300 is tilted vertically and its upper side is tilted toward the top as previously determined, the tilts of the player terminal 300 along the X axis, Y axis and Z axis as detected by the acceleration sensor 312 will be provided as the output which is transmitted to the function display switching function 311

In response to the receipt of the tilt provided as the output, the function display switching function 311 will be enabled to switch from the horizontally tilted scorecard list screen 2010 to the vertically tilted menu screen 1000.

The acceleration sensor 312 that is provided on the player terminal 300 is capable of detecting any tilt along the X axis, Y axis and Z axis of the player terminal 300, for example, when the unconfirmed share scorecard 2013 tilted horizontally is presented by the display unit 306. For example, if it is assumed that the player terminal 300 is tilted vertically and its upper side is tilted toward the top as previously determined, the tilts of the player terminal 300 along the X axis, Y axis and Z axis as detected by the acceleration sensor 312 will be provided as the output which is transmitted to the function display switching function 311

In response to the receipt of the tilt provided as the output, the function display switching function 311 will be enabled to switch from the horizontally tilted unconfirmed share scorecard 2013 to the vertically tilted current position information measuring screen 1013.

The acceleration sensor 312 that is provided on the player terminal 300 is capable of detecting any tilt of the player terminal 300 along the X axis, Y axis and Z axis when the current position information measuring screen 1013 is tilted vertically as presented by the display unit 306.

For example, if it is assumed that the player terminal 300 is tilted horizontally and its right side is tilted toward the top or bottom as previously determined, the tilts along the X axis, Y axis and Y axis as detected by the acceleration sensor 312 will be provided as the output which is transmitted to the function display switching function 311.

In response to the receipt of the tilt provided as the output, the function display switching function 311 will be enabled to switch from the vertically tilted current position information measuring screen 1013 to the horizontally tilted unconfirmed share scorecard 2013.

By tilting the player terminal 300 in the manners described above, the menu screen 1000, the scorecard list screen 2010, the unconfirmed share scorecard 2013 and the current position information measuring screen 1013 can be switched from one display to another display.

It may be appreciated from the foregoing description that the golf player 200 may omit some of the entering operations that will be performed on the input unit 305 when the menu screen 1000 appears, and can permit the various function screens described above to appear. Thus, the golf player 300 can operate the player terminal more effectively while the golf player 300 is playing the golf.

Although the several preferred embodiments of the present invention have been described, the present invention is not limited to those embodiments but may be modified in various ways or manners without departing from the spirit and scope of the invention as defined in the appended claims.

DESCRIPTION OF REFERENCE NUMERALS

The following is a list of the reference numerals referred to in the specification and shown in the accompanying drawings:
100 Information Sharing System
200a, 200b, 200c Golf Players
300a, 300b, 300c Player Terminals
301 Information Transmitter/Receiver
302 Controller
303 Store Unit
303 Golf Play Facilities Database 304a Golf Play Facilities Name Table
304b Golf Course Name Table
304c Number of Holes Table
304d Hole Number Table
304e Number of Pars Table
304f Service Supplier's Course Data Table
304g Golf Player's Course Data Table
304h Score Table
305 Input Unit
305 Display Unit
307 Position Information Acquiring Function
308 Scorecard Creating Function
309 Golf Ball Carry Distance Computing Function
310 Golf Ball Remaining Distance Computing Function
311 Function Display Switching Function
312 Acceleration Sensor
400 Server Device
401 Information Transmitting/Receiving Function
402 Controller
403 Store Unit
404 Golf Play Facilities Database
404a Golf Play Facilities Name Table
404b Golf Course Name Table
404c Number of Holes Table
404d Hole Number Table
404e Number of Pars Table
404f Service Supplier's Course Data Table
404g Golf Player's Course Data Table
404h Score Table
405 Application Program
406 Golf Play Facilities Selecting Function
407 Scorecard ID Generating Function
408 Share Password Generating Function
409 Share Password Authenticating Function
410 Score Published Terminal Information Generating Function
411 Score Gathering Function
412 Estimated information Gathering Function
500a, 500b Viewers
600a, 600b Viewer Terminals
601 Information Transmitting/Receiving Function
602 Controller
603 Store Unit
6-04 Input Unit
605 Display Unit
700 Communications Network
800 Satellite Communications Circuit
900 GPS Satellite
1000 Menu Select Screen
1000a Unconfirmed Score Call Section
1000b Non-estimated Course Data Call Section
1000c Round Setting Indicating Section
1000d Course Data Create Indicating Section
1001 Course Data Create/Estimate Selecting Screen
1001a New Course Data Create Indicating Section
1001b Course Data Estimate Indicating Section
1002 Golf Play Facilities Searching Screen
1002a Automatic Search Indicating Section
1002b Manual Search Indicating Section
1002c History Search Indicating Section
1003 Nation Name Selecting Screen
1003a Nation Name
1004a Region Selecting Screen
1004a Region Name
1005 Golf Play Facilities List Screen
1005a Golf Play Facilities Data
1005b Service Supplier's Golf Play Facilities Data
1005c Player's Golf Play Facilities Data
1006 Hole List Screen
1006a Hole Data
1007 Target Coordinates Setting Screen
1008-1011 Green Display Section
1008a-1011a Green Icon
1008a-1011b Target Coordinates Icon
1008c-1011c Target Coordinates Name Indicating Section
1012 Target Coordinates Measuring Screen
1012a Target Coordinates Measure Indicating Section
1012b Selected Target Coordinates Name
1012c Green Icon
1012d Target Coordinates Icon
1013 Current Position Information Measuring Screen
1013a Position Information Measure Display Section
1013b Position Correction Display Section
1014 Round Condition Selecting Screen
1014a First Round Selecting Section
1014b Second Round Selecting Section
1015a First Course Data Selecting Section
1015b Second Course Data Selecting Section
1016 Information Registering Section
1017 Remaining Distance/Carry Distance Measuring Section
1017a Measurement Indicating Section
1017b First Remaining Distance Display Section
1017c Second Remaining Distance Display Section
1017d Third Remaining Distance Display Section
1017e Carry Distance Display Section
1017f Course Data Estimation Indicating Section
1018 Golf Hole
1019 Fairway
1020 Tee Ground
1021 Green
1022 Course Data Estimation Entering Screen
1022a-1022g Estimation Points
1023 Estimation Icon
1024 Estimation Point Registering Section
2000a New Round Selecting Section
2000b Round Participation Selecting Section
2001 Golf Play Facilities Searching Screen
2001a Automatic Search Indicating Section
2001b Manual Search Indicating Section
2001c History Search Indicating Section
2002 Nation Name Selecting Screen
2002a Nation Name
2003 Region Name Selecting Screen
2003a Region Name
2004 Authenticating Screen
2004a Share Password Entering Section
2004b Authenticate Indicating Section
2005 Scorecard Create Selecting Screen
2005a Non-share Scorecard Create Selecting Screen
2005b Share Scorecard Create Selecting Section
2006 Share Password/Score Published Terminal Information Issue Selecting Screen
2006a Share Password Issue Indicating Section
2006b Score Published Terminal Information Issue Indicating Section
2006c Issue Completion Selecting Screen
2007 Score Published Terminal Information Noticing Screen
2007a Published URL
2008 Share Password Issue Noticing Screen
2008a Share Password
2009 Scorecard Create Completion Noticing Screen
2009a Notice Confirming Section
2010 Scorecard List Screen 2010a Unconfirmed Scorecard
2010b Confirmed Scorecard
2010a Unconfirmed Scorecard
2011 Golf Scorecard
2012 Confirmed Share Scorecard
2013 Unconfirmed. Shared Scorecard
2013a Hole Number
2014 Score Entering Screen
2014a Score Entering Section
2014b Number of Putts Entering Section

The invention claimed is:

1. An information sharing system that enables mutual communications to occur between a server device and each of respective player terminals for a plurality of golf players over a communications network, wherein the information sharing system comprises:
   said server device that includes a scorecard ID creating means for receiving a request to create a golf scorecard from each of the plurality of player terminals, generating a scorecard ID consisting of a master ID for causing each of the player terminals to create said golf scorecard and a slave ID for identifying each of the player terminals, and transmitting said generated scorecard ID to each of the player terminals and
   said plurality of player terminals each of which includes a scorecard creating means for acquiring said scorecard ID and creating a golf scorecard in response to the receipt of said acquired scorecard ID and information related to a golf course previously stored therein, said server device further including a share password generating means for receiving, from one particular player terminal of the plurality of player terminals, a request to cause said created golf scorecard to be shared by each of the other golf player terminals, generating a share password with which said master ID is associated and which causes said golf scorecard to be shared by each of the other player terminals and transmitting said share password to each of the other player terminals, and a share password authenticating means for authenticating a request to authenticate said share password from each of the other player terminals which have acquired said share password from said one particular player terminal and matching a master ID which is the same as said master ID associated with said share password against the master ID's associated with a plurality of scorecard ID's previously stored in a storing means on said server device,
   said scorecard ID generating means being operated for re-generating a scorecard ID consisting of said matched master ID and the slave ID for identifying said one particular player terminal and each of the other player terminals and transmitting said re-generated scorecard ID to said one particular player terminal and said each of the other player terminals, and
   said scorecard creating means being operated for creating a golf scorecard to be shared by a plurality of golf players in response to the receipt of said re-generated scorecard ID and the information related to said golf course.

2. An information sharing system as defined in claim 1, wherein said server device further includes a scorecard published player terminal information generating means for receiving, from said one particular player terminal, a request to publish said scorecard for said one particular golf player so that one or more viewers who desire to view said scorecard can be allowed to view said scorecard, generating said golf scorecard published player terminal information that can be viewed by said one or more viewers on their respective viewer terminals over said communications network, and transmitting said scorecard to said one particular player terminal, said one particular player terminal that has acquired said golf scorecard published terminal information including a transmitting means for transmitting said golf scorecard published terminal information to the respective viewer terminals for said one or more viewers who have acquired said scorecard.

3. An information sharing system as defined in claim 1, wherein said player terminal is capable of exchanging communications with the GPS satellite over the satellite communication circuit, and further includes a current position information acquiring means for acquiring the current position information for each of the player terminals by way of the satellite communications with said GPS satellite and wherein
   said server device further includes a golf ball carry distance computing means for acquiring the information related to at least two current positions as acquired by said player terminal and computing a golf ball distance traveled by said golf player as the distance for a stroked golf ball to travel in response to the receipt of the information related to said at least two current positions,
   a remaining distance computing means for computing the distance that remains from the golf ball's current position for each of said other golf players up to the green as the distance from the golf ball's current position for said each of the other player terminals to the target coordinates up to the green in response to the receipt of the position information for said one particular player terminal that corresponds to the target coordinates up to the green as transmitted by said one particular player terminal and the position information for each of said other player terminals as transmitted by each of said other player terminals and
   an estimated information gathering means for acquiring estimated information as estimated by said other golf players in respect of the target coordinates up to the green, wherein said estimated information as gathered is transmitted to each of said other player terminals.

4. An information sharing system as defined in claim 3, wherein said player terminal further includes:
   a tilt detector means for detecting any tilt of said player terminal along the X axis, Y axis and Z axis and
   a function display switching means for detecting any tilt of said player terminal as indicated by said tilt detector means and switching between one function indicated as the vertical tilt and one function indicated as the horizontal tilt or between the other function indicated as the horizontal tilt and the other function indicated as the vertical tilt, all of said indications being provided by an information display means included in said player terminal.

5. A non-transitory computer-readable recording medium containing computer program instructions which when executed by a server device programmed with the instructions causes the server device to act as an information sharing system for enabling mutual communications to occur over a communications network with a plurality of player terminals, said server device including a scorecard ID creating means for receiving a request to create a golf scorecard from each of the plurality of player terminals, generating a scorecard ID consisting of a master ID for causing each of the player terminals to create said golf scorecard and a slave ID for identifying each of the player terminals, and transmitting said generated scorecard ID to each of the player terminals and said plurality of player terminals each including a scorecard creating means for acquiring said scorecard ID and creating a golf scorecard in response to the receipt of said acquired scorecard ID and information related to a golf course previously stored therein, said server device further includes a share password generating means for receiving, from one particular player terminal of the plurality of player terminals, a request to cause said created golf scorecard to be shared by each of the other golf player terminals, generating a share password with which said master ID is associated and which causes said golf scorecard to be shared by each of the other player terminals and transmitting said share password to each of the other player terminals, and a share password authenticating means for authenticating a request to authenticate said share password from each of the other player terminals which have acquired said share password from said one particular player terminal and matching a master ID which is the same as said master ID associated with said share password against the master ID's associated with a plurality of scorecard ID's previously stored in a storing means on said server device, said scorecard ID generating means being operated for re-generating a scorecard ID consisting of said matched master ID and the slave ID for identifying said one particular player terminal and each of the other player terminals and transmitting said re-generated scorecard ID to said one particular player terminal and said each of the other player terminals, and said scorecard creating means being operated for creating a golf scorecard to be shared by a plurality of golf players in response to the receipt of said re-generated scorecard ID and the information related to said golf course, the instructions causing the server device to:

receive the request to create the golf scorecard from each of the plurality of player terminals;

generate the scorecard ID consisting of the master ID for causing each of the player terminals to create said golf scorecard and the slave ID for identifying each of the player terminals;

transmit said generated scorecard ID to each of the player terminals wherein said plurality of player terminals each create a golf scorecard in response to the receipt of said acquired scorecard ID and information related to the golf course previously stored therein;

receiving, from the one particular player terminal of the plurality of player terminals, the request to cause said created golf scorecard to be shared by each of the other golf player terminals;

generating the share password with which said master ID is associated and which causes said golf scorecard to be shared by each of the other player terminals;

transmitting said share password to each of the other player terminals;

authenticating the request to authenticate said share password from each of the other player terminals which have acquired said share password from said one particular player terminal;

matching the master ID which is the same as said master ID associated with said share password against the master ID's associated with the plurality of scorecard ID's previously stored in the storing means on said server device;

re-generating the scorecard ID consisting of said matched master ID and the slave ID for identifying said one particular player terminal and each of the other player terminals; and transmitting said re-generated scorecard ID to said one particular player terminal and said each of the other player terminals, and wherein each player terminal creates the golf scorecard to be shared by a plurality of golf players in response to the receipt of said re-generated scorecard ID and the information related to said golf course.

\* \* \* \* \*